United States Patent
Raghavan et al.

(10) Patent No.: US 12,068,830 B2
(45) Date of Patent: *Aug. 20, 2024

(54) CHANNEL STATISTICS BASED ADAPTIVE BEAM WEIGHT ESTIMATION

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/354,482

(22) Filed: Jul. 18, 2023

(65) Prior Publication Data

US 2024/0007174 A1    Jan. 4, 2024

Related U.S. Application Data

(63) Continuation of application No. 17/701,131, filed on Mar. 22, 2022, now Pat. No. 11,750,267.

(51) Int. Cl.
*H04B 7/08*     (2006.01)
*H04L 25/02*    (2006.01)

(52) U.S. Cl.
CPC ......... *H04B 7/0857* (2013.01); *H04B 7/0888* (2013.01); *H04L 25/021* (2013.01); *H04L 25/0242* (2013.01)

(58) Field of Classification Search
CPC ... H04B 7/0857; H04B 7/0888; H04L 25/021; H04L 25/0242

USPC .................................................. 375/267, 347
See application file for complete search history.

(56) References Cited

U.S. PATENT DOCUMENTS

| | | | |
|---|---|---|---|
| 11,750,267 B1 | 9/2023 | Raghavan et al. | |
| 2016/0380680 A1* | 12/2016 | Yang | H04B 7/0639 370/329 |
| 2017/0346580 A1* | 11/2017 | Astrom | H04L 5/006 |
| 2018/0262253 A1 | 9/2018 | Rahman et al. | |
| 2020/0052852 A1* | 2/2020 | Vitthaladevuni | H04L 5/0053 |
| 2020/0196317 A1* | 6/2020 | Fakoorian | H04B 7/0854 |
| 2021/0036893 A1 | 2/2021 | Visotsky et al. | |
| 2021/0234600 A1 | 7/2021 | Vieira et al. | |
| 2022/0210799 A1 | 6/2022 | Zhu et al. | |

* cited by examiner

*Primary Examiner* — Don N Vo
(74) *Attorney, Agent, or Firm* — Holland & Hart LLP

(57) ABSTRACT

Methods, systems, and devices for wireless communications are described. In some examples, a user equipment (UE) may receive a control message indicating a set of sampling beams defined for the UE. The UE may measure a set of received signal strengths for communications from a wireless node associated with a set of linear combinations of sampling beams from the set of sampling beams defined at the UE. The UE may calculate a set of entries of a channel covariance matrix based on the set of received signal strengths of the set of linear combinations of the sampling beams from the set of sampling beams defined for the UE. As such, the UE may communicate with the wireless node based on applying a set of beam weights to an antenna array of the UE. In some examples, the set of beam weights may be based on the channel covariance matrix.

30 Claims, 13 Drawing Sheets

400

CHANNEL STATISTICS BASED ADAPTIVE BEAM WEIGHT ESTIMATION

CROSS REFERENCE

The present application for patent is a continuation of U.S. Non-Provisional patent application Ser. No. 17/701,131 by RAGHAVAN et al., entitled "CHANNEL STATISTICS BASED ADAPTIVE BEAM WEIGHT ESTIMATION," filed Mar. 22, 2022, assigned to the assignee hereof, and expressly incorporated by reference herein.

FIELD OF TECHNOLOGY

The following relates to wireless communications, including channel statistics based adaptive beam weight estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support channel statistics based adaptive beam weight estimation. For example, the described techniques provide for a wireless device to utilize linear combinations of beams from a set of sampling beams to obtain statistical information associated with a wireless channel. For instance, a user equipment (UE) may use the set of sampling beams associated with an antenna array to receive a set of reference signals from a transmitting wireless node and estimate a set of received signal strengths associated with the reference signals. Based on the received signal strengths, the UE may calculate a set of entries of a channel covariance matrix, and use the entries to determine a set of beam weights to apply to the antenna array. As such, the UE may communicate one or more messages with the wireless node based on applying the set of beam weights to the antenna array.

A method for wireless communications is described. The method may include measuring a set of received signal strengths for communications from a wireless node corresponding to a set of multiple linear combinations of sampling beams from a set of sampling beams, where the set of sampling beams are defined for the UE, calculating a set of entries of a channel covariance matrix based on the set of received signal strengths of the set of multiple linear combinations of the sampling beams from the set of sampling beams defined for the UE, and communicating with the wireless node based on applying a set of beam weights to an antenna array of the UE, where the set of beam weights are based on the channel covariance matrix.

An apparatus for wireless communications is described. The apparatus may include a processor, memory coupled with the processor, and instructions stored in the memory. The instructions may be executable by the processor to cause the apparatus to measure a set of received signal strengths for communications from a wireless node corresponding to a set of multiple linear combinations of sampling beams from a set of sampling beams, where the set of sampling beams are defined for the UE, calculate a set of entries of a channel covariance matrix based on the set of received signal strengths of the set of multiple linear combinations of the sampling beams from the set of sampling beams defined for the UE, and communicate with the wireless node based on applying a set of beam weights to an antenna array of the UE, where the set of beam weights are based on the channel covariance matrix.

Another apparatus for wireless communications is described. The apparatus may include means for measuring a set of received signal strengths for communications from a wireless node corresponding to a set of multiple linear combinations of sampling beams from a set of sampling beams, where the set of sampling beams are defined for the UE, means for calculating a set of entries of a channel covariance matrix based on the set of received signal strengths of the set of multiple linear combinations of the sampling beams from the set of sampling beams defined for the UE, and means for communicating with the wireless node based on applying a set of beam weights to an antenna array of the UE, where the set of beam weights are based on the channel covariance matrix.

A non-transitory computer-readable medium storing code for wireless communications is described. The code may include instructions executable by a processor to measure a set of received signal strengths for communications from a wireless node corresponding to a set of multiple linear combinations of sampling beams from a set of sampling beams, where the set of sampling beams are defined for the UE, calculate a set of entries of a channel covariance matrix based on the set of received signal strengths of the set of multiple linear combinations of the sampling beams from the set of sampling beams defined for the UE, and communicate with the wireless node based on applying a set of beam weights to an antenna array of the UE, where the set of beam weights are based on the channel covariance matrix.

Some examples of the method, apparatuses, and non-transitory computer-readable medium described herein may further include operations, features, means, or instructions for receiving a control message from the wireless node indicating or configuring the set of sampling beams defined for the UE.

In some examples of the method, apparatuses, and non-transitory computer-readable medium described herein, calculating the set of entries of the channel covariance matrix may include operations, features, means, or instructions for calculating a set of diagonal entries of the channel covariance matrix based on the set of sampling beams, calculating a first set of off-diagonal entries of the channel covariance matrix, where each of the first set of off-diagonal entries may be calculated using the set of received signal strengths of the set of multiple linear combinations of the sampling beams, and estimating a second set of off-diagonal entries of the channel covariance matrix that may be different from the first set of off-diagonal entries based on the calculated first set of off-diagonal entries and the calculated set of diagonal entries.

Some examples of the method, apparatuses, and non-transitory computer-readable medium described herein may further include operations, features, means, or instructions for receiving a control message indicating a technique for determining the first set of off-diagonal entries to be calculated in the channel covariance matrix, where the technique may be from a set of techniques including: a first technique based on a fixed row or a fixed column of the channel covariance matrix, a second technique based on calculating a secondary diagonal of the channel covariance matrix, and a third technique based on a row and a column anchored to a diagonal entry of the set of diagonal entries of the channel covariance matrix.

In some examples of the method, apparatuses, and non-transitory computer-readable medium described herein, the technique may be defined according to one or more of control signaling received from the wireless node, a priori rule stored at the UE, or both.

Some examples of the method, apparatuses, and non-transitory computer-readable medium described herein may further include operations, features, means, or instructions for calculating a dominant eigenvector of the channel covariance matrix based on one or more of: the calculated set of diagonal entries, the calculated first set of off-diagonal entries, or the estimated second set of off-diagonal entries, where the set of beam weights may be selected according to the dominant eigenvector.

In some examples of the method, apparatuses, and non-transitory computer-readable medium described herein, the calculated set of diagonal entries and the method, apparatuses, and non-transitory computer-readable medium may include further operations, features, means, or instructions for setting a second portion of the channel covariance matrix to zero.

In some examples of the method, apparatuses, and non-transitory computer-readable medium described herein, the set of received signal strengths corresponds to a single or multiple subcarriers and the communicating with the wireless node occurs over multiple subcarriers.

In some examples of the method, apparatuses, and non-transitory computer-readable medium described herein, one or more beams of the set of sampling beams may be defined by a set of columns of a unitary matrix.

In some examples of the method, apparatuses, and non-transitory computer-readable medium described herein, one or more beams of the set of sampling beams may be defined by selecting a single antenna from a set of antenna elements of the antenna array.

In some examples of the method, apparatuses, and non-transitory computer-readable medium described herein, the wireless node may be a network entity or a second UE.

In some examples of the method, apparatuses, and non-transitory computer-readable medium described herein, a capability of the set of sampling beams to minimize a mean squared error in calculating the set of entries of the channel covariance matrix, an amplitude control capability of the UE associated with generating the set of multiple linear combinations of the sampling beams from the set of sampling beams, and a storage capacity of a radio frequency integrated chip (RFIC) memory of the UE.

A method for wireless communications is described. The method may include receiving, at the UE, a control message indicating a set of sampling beams defined for the UE and communicating with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE.

An apparatus for wireless communications is described. The apparatus may include a processor, memory coupled with the processor, and instructions stored in the memory. The instructions may be executable by the processor to cause the apparatus to receive, at the UE, a control message indicating a set of sampling beams defined for the UE and communicate with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE.

Another apparatus for wireless communications is described. The apparatus may include means for receiving, at the UE, a control message indicating a set of sampling beams defined for the UE and means for communicating with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE.

A non-transitory computer-readable medium storing code for wireless communications is described. The code may include instructions executable by a processor to receive, at the UE, a control message indicating a set of sampling beams defined for the UE and communicate with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE.

Some examples of the method, apparatuses, and non-transitory computer-readable medium described herein may further include operations, features, means, or instructions for receiving a second control message indicating a technique for calculating a first set of off-diagonal entries of the channel covariance matrix, where the technique may be from a set of techniques including: a first technique based on a fixed row or column of the channel covariance matrix, a second technique based on calculating a secondary diagonal of the channel covariance matrix, and a third technique based on a row and a column anchored to a diagonal entry of a set of diagonal entries of the channel covariance matrix.

In some examples of the method, apparatuses, and non-transitory computer-readable medium described herein, the wireless node may be a network entity or a second UE.

Some examples of the method, apparatuses, and non-transitory computer-readable medium described herein may further include operations, features, means, or instructions for transmitting an assistance information message indicating the set of sampling beams defined for the UE, where the control message may be received based on the assistance information message.

Some examples of the method, apparatuses, and non-transitory computer-readable medium described herein may further include operations, features, means, or instructions for transmitting, to a second UE via sidelink, an indication of the set of beam weights used for communicating with the second UE and receiving, from the second UE via sidelink, an indication of a second set of beam weights used at the second UE for communication with the UE.

In some examples of the method, apparatuses, and non-transitory computer-readable medium described herein, the set of sampling beams may be based on one or more of a capability of the sampling beams to minimize a mean squared error in calculating a set of entries of the channel covariance matrix, an amplitude control capability of the UE associated with the linear combinations of the sampling beams, or a storage capacity of a RFIC memory of the UE.

DETAILED DESCRIPTION

Figure 1:
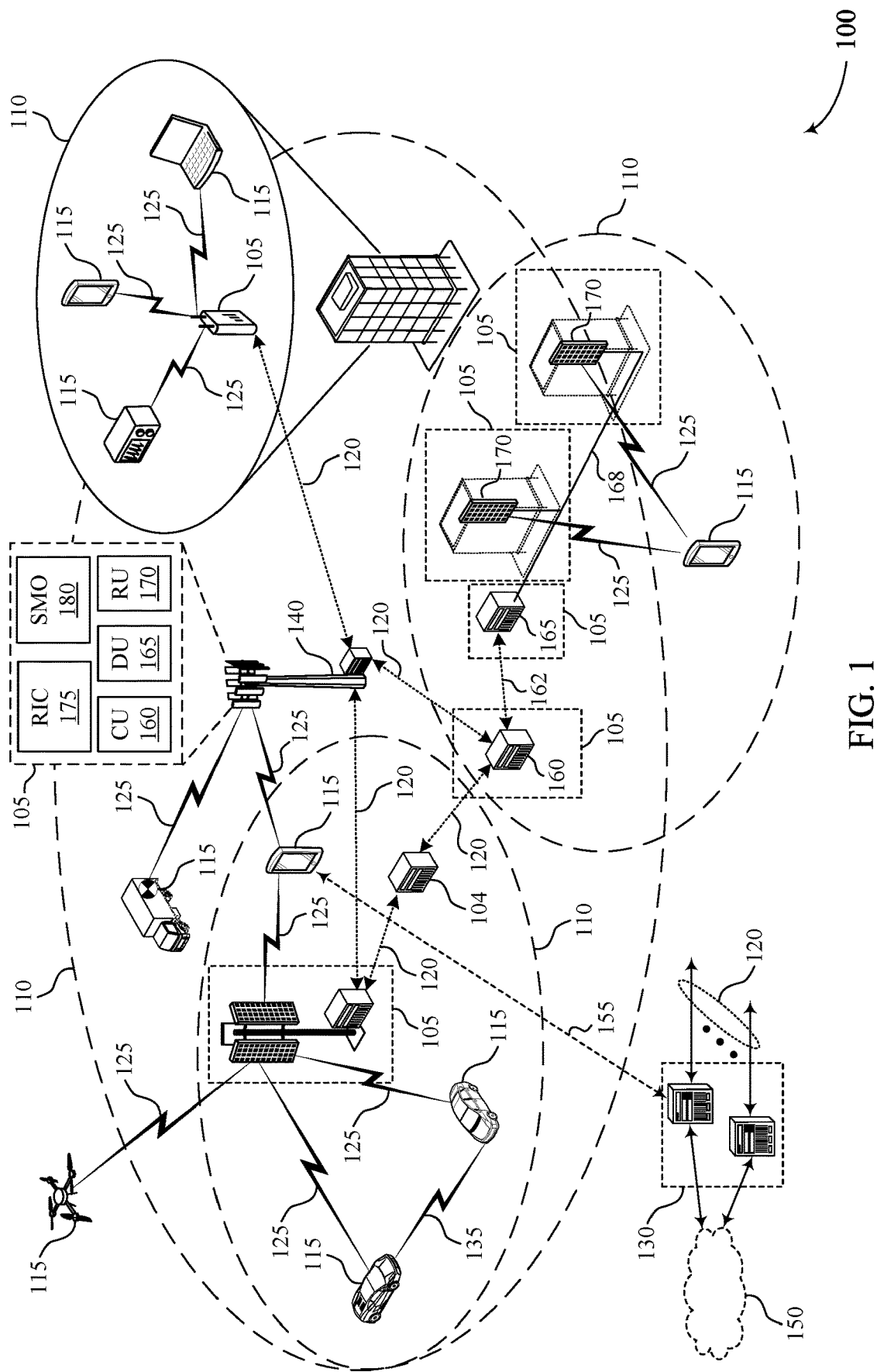
FIG. 1 illustrates an example of a wireless communications system that supports channel statistics based adaptive beam weight estimation in accordance with one or more aspects of the present disclosure.

A wireless device (e.g., a user equipment (UE)) may support beamformed wireless communications over a high frequency spectrum, such as millimeter wave (mmW) spectrum or a sub-terahertz (THz) spectrum, among other examples. As such, the wireless device may combine energy across a set of antenna array elements during beamforming to minimize path loss for communications over the high frequency spectrum. For example, the wireless device may be configured with a fixed analog/hybrid beamforming codebook which may indicate various sets of beam weights to apply to antenna elements of an antenna array, resulting in various beams for use in wireless communications. In some cases, however, the fixed codebook may be hard coded at the wireless device unable to adapt to environmental conditions (e.g., blockages from a user's hand or a phone case or other materials in the environment). As such, it may be advantageous for the wireless device to apply adaptive beam weights to beamforming techniques.

Adaptive beam weights may be enabled at the wireless device level according to the techniques described herein. In some examples, a UE may utilize linear combinations of beams from a set of sampling beams to obtain statistical information associated with a wireless channel. For instance, the UE may use the set of sampling beams associated with an antenna array to receive a set of reference signals from a transmitting wireless node and estimate a set of received signal strengths associated with the reference signals. Based on the received signal strengths, the UE may calculate a set of entries of a channel covariance matrix and use the entries to determine a set of beam weights to apply to the antenna array. As such, the UE may communicate one or more messages with the wireless node based on applying the set of beam weights to the antenna array.

In some examples, the UE may generate the sampling beams by applying equal gain across each antenna array element of the antenna array. Additionally, or alternatively, the UE may generate the sampling beams by sampling each antenna array element separately. In some cases, the UE may decrease the time to generate the channel covariance matrix by using various matrix channel estimation techniques. In some examples, the UE may use a row or column based technique to estimate one or more entries of the channel covariance matrix. In some examples, the UE may use a secondary/off diagonal technique to estimate one or more entries of the channel covariance matrix. In some examples, the UE may use an anchored adaptive index technique to estimate one or more entries of the channel covariance matrix. In some cases, the UE may determine which technique to use based on signaling from the wireless node.

Aspects of the disclosure are initially described in the context of wireless communications systems. Aspects of the disclosure are further illustrated by and described with channel covariance matrix generation schemes and process flows. Aspects of the disclosure are further illustrated by and described with reference to apparatus diagrams, system diagrams, and flowcharts that relate to channel statistics based adaptive beam weight estimation.

FIG. 1 illustrates an example of a wireless communications system 100 that supports channel statistics based adaptive beam weight estimation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125

(e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or Rus 170, and the one or more DUs 165 or Rus 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more Rus 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more Rus 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more Rus 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support channel statistics based adaptive beam weight estimation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, Rus 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multicarrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and N f may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples of wireless communications system 100, a UE 115 may combine energy across a set of antenna array elements during beamforming to minimize pathloss for communications over a given frequency spectrum. For example, the UE 115 may be configured with a fixed codebook which may indicate various sets of beam weights to apply to antenna elements of an antenna array, resulting in various beams for use in wireless communications. In some cases, however, the fixed codebook may be hardcoded at the UE 115 and as such, may be unable to adapt to environmental conditions. As such, it may be advantageous for the wireless device to apply adaptive beam weights to beamforming techniques.

In some examples, a UE 115 may utilize linear combinations of beams from a set of sampling beams to obtain statistical information associated with a wireless channel. For instance, the UE 115 may use the set of sampling beams associated with an antenna array to receive a set of reference signals from a transmitting wireless node (e.g., a network entity 105 or a second UE 115) and estimate a set of received signal strengths associated with the reference signals. Based on the received signal strengths, the UE may calculate a set of entries of a channel covariance matrix, and use the entries to determine a set of beam weights to apply to the antenna array. As such, the UE may communicate one or more messages with the wireless node based on applying the set of beam weights to the antenna array.

In some examples, the UE 115 may generate the sampling beams by applying equal gain across each antenna array element of the antenna array. Additionally, or alternatively, the UE may generate the sampling beams by sampling each antenna array element separately. Further discussion of various sampling beams defined at the UE 115 are described herein, including with reference to FIG. 2.

In some cases, the UE may decrease the time to generate the channel covariance matrix by using various matrix channel estimation techniques. In some examples, the UE may use a row or column based technique to estimate one or more entries of the channel covariance matrix. In some examples, the UE may use a secondary/off diagonal technique to estimate one or more entries of the channel covariance matrix. In some examples, the UE may use an anchored adaptive index technique to estimate one or more entries of the channel covariance matrix. In some cases, the UE may determine which technique to use based on signaling from the wireless node.

Figure 2:
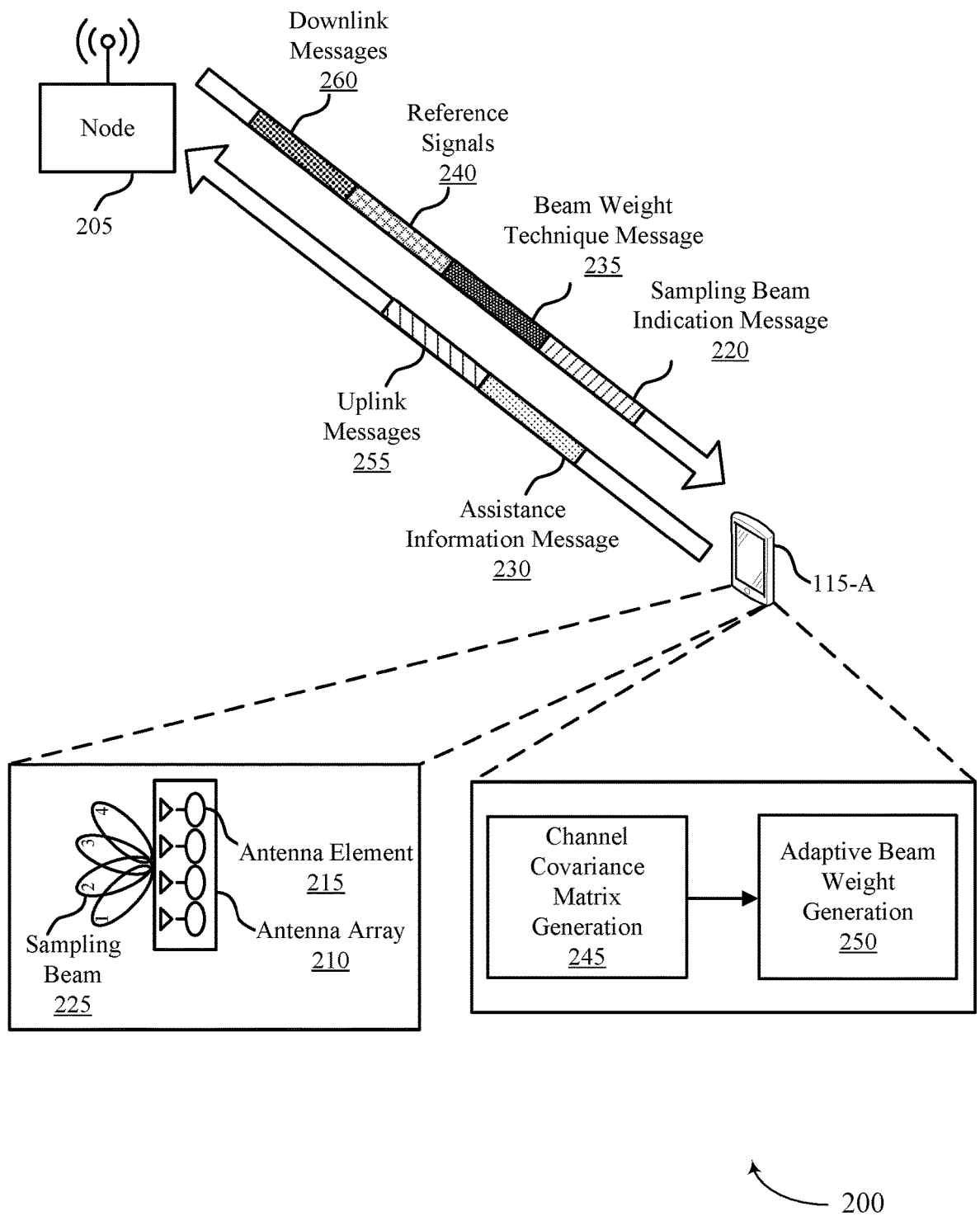
FIG. 2 illustrates an example of a wireless communications system that supports channel statistics based adaptive beam weight estimation in accordance with one or more aspects of the present disclosure.

FIG. 2 illustrates an example of a wireless communications system 200 that supports channel statistics based adaptive beam weight estimation in accordance with one or more aspects of the present disclosure. In some examples, wireless communications system 200 may implement one or more aspects of wireless communications system 100. For instance, wireless communications system 200 may include a UE 115-*a*, which may be an example of a UE 115 described with reference to FIG. 1, and a node 205, which may be an example of either a UE 115 or a network entity 105 as described with reference to FIG. 1. While examples are discussed herein, any number of devices and device types may be used to accomplish implementations described in the present disclosure. Wireless communications system 200 may support indications for the UE 115-*a* to utilize adaptive beam weights during wireless communications, where the UE 115-*a* may generate the adaptive beam weights based on calculating entries of a channel covariance matrix associated with one or more reference signals received from the node 205.

In some examples, the node 205 and the UE 115-*a* may communicate via millimeter wave (mmW) systems. As such, the node 205 and the UE 115-*a* may be configured with one or more respective antenna arrays 210 that may be used for mmW communications. For instance, as illustrated in FIG. 2, the UE 115-*a* may be configured with the antenna array 210 which may include multiple antenna elements 215. While FIG. 2 illustrates the UE 115-*a* configured with one antenna array 210 that includes four antenna elements 215, it is understood that the UE 115-*a* may be configured with any number of antenna arrays 210, where each antenna array 210 may include any number of antenna elements 215.

In some examples, the multiple antenna elements 215 may be used for various beamforming techniques. For example, the UE 115-*a* may be pre-configured (e.g., hard coded) with a fixed codebook (e.g., stored in radio frequency integrated circuit (RFIC) memory) that includes multiple beam weights associated with the antenna elements at the UE 115-*a* for use in beamforming. As such, the node 205 and the UE 115-*a* may perform beam training (e.g., hierarchical beam training) using the beam weights indicated in the fixed codebook to determine which of the indicated beam weights to use for wireless communications. In some examples, this hierarchical beam training may be an example of a static codebook approach. However, due to the fixed codebook being hard coded, the static codebook approach may be unable to adapt to environmental conditions as well as impairments that may be dynamic. For example, the beams generated using the fixed codebook may experience blockages from a user's hand or a protective case that at least partially covers the UE 115-*a*, among other examples. As such, it may be advantageous for the UE 115-*a* to apply adaptive beam weights to beamforming techniques.

Adaptive beam weights may be enabled at the wireless device level according to the techniques described herein. In some examples, the UE 115-*a* may utilize linear combinations of beams from a set of sampling beams 225 to obtain statistical information associated with a wireless channel. Based on the obtained statistical information, the UE 115-*a* may adapt one or more beam weights associated with one or more antenna elements 215 (e.g., phase shifter and amplitude control). In some examples, the UE 115-*a* may generate the adaptive beam weights for use over a channel based on generating a channel covariance matrix associated with the given channel and an associated subcarrier. For instance, a channel matrix (denoted as H(k)) may be an example of an N×M matrix over a k-th subcarrier. As such, the vector channel seen at the receiver end h(k) may be equal H(k)·f, where f denotes an M×1 beamformer at the transmission side (e.g., at the node 205). In some examples, the UE 115-*a* may realize a reference signal received power (RSRP) for a given reference signal using an N×1 beamforming vector g in combination with h(k) as denoted in Equation 1:

$$RSRP = \sum_k |g^H h(k)|^2 = g^H \cdot \left( \sum_k h(k)h(k)^H \right) \cdot g$$

where $\sum_k h(k)h(k)^H$, may be an example of the channel covariance matrix (e.g., matrix R) corresponding to the vector channel h(k). As such, the UE 115-*a* may use RSRP for multiple reference signals in combination with the beamforming vector g to generate the channel covariance matrix associated with a given channel.

In some examples of estimating the channel covariance matrix, the UE 115-*a* may take RSRP measurements over multiple candidate beams which may be linear combinations of a subset of beams from a set of beams configured at the UE 115-*a* (e.g., sampling beams 225). For example, with reference to FIG. 2 where N=4, the UE 115-*a* may use four sampling beams 225 (e.g., $w_1$, $w_2$, $w_3$, and $w_4$) where each sampling beam 225 may represent a 4×1 vector of unit-norm. In some examples, the UE 115-*a* may use $N^2$ (e.g., 16) candidate beams where each of the candidate beams may be a linear combination of one or more of the sampling beams 225 (e.g., $w_1$, $w_2$, $w_3$, $w_4$, $w_1+w_2$, $w_1+iw_2$, $w_1+w_3$, $w_1+iw_3$, $w_1+w_4$, $w_1+iw_4$, $w_2+w_3$, $w_2+iw_3$, $w_2+w_4$, $w_2+iw_4$, $w_3+w_4$, $w_3+iw_4$).

In some examples, the UE 115-*a* may receive from the node 205 a sampling beam indication message 220 which may indicate the set of sampling beams 225 defined at the UE 115-*a*. In such examples, the node 205 may transmit the sampling beam indication message 220 based on receiving an assistance information message 230 from the UE 115-*a*. For instance, the set of sampling beams 225 defined may be based on a capability of the sampling beams to minimize a mean squared error in calculating a set of entries of the channel covariance matrix, an amplitude control capability of the UE 115-*a* associated with the linear combinations of the sampling beams 225, or a storage capacity of the RFIC memory of the UE 115-*a*.

In some cases, various sets of sampling beams 225 may be used at the UE 115-*a*. For example, the UE 115-*a* may use a set of unitary (e.g., orthogonal and unit-norm) sampling beams 225 with equal gain across each of the antenna elements 215 to increase estimation performance. As such, the UE 115-*a* may use a set of sampling beams 225 in accordance with either a matrix $W_1$ or a matrix $W_2$ as denoted in Equation 2:

$$W_1 = \frac{1}{2}\begin{bmatrix} 1 & 1 & 1 & 1 \\ 1 & -1 & i & -i \\ 1 & 1 & -1 & -1 \\ 1 & -1 & -i & i \end{bmatrix}; W_2 = \frac{1}{2}\begin{bmatrix} 1 & 1 & 1 & 1 \\ 1 & -1 & -1 & 1 \\ 1 & 1 & -1 & -1 \\ 1 & -1 & 1 & -1 \end{bmatrix}$$

where the first column of matrices $W_1$ and $W_2$ may equal $w_1$, the second column may equal $w_2$, the third column may equal $w_3$, and the fourth column may equal $w_4$. Based on matrices $W_1$ and $W_2$ including both real and imaginary parts, the possible resulting beam weights from the sampling beam set may use the amplitudes:

0, 1/2, $1/\sqrt{2}$, $1/2\sqrt{2}$

In some examples, the amplitude of the beam weights for each entry may use a reduced set of values:

0, 1/2, $1/\sqrt{2}$

As such, the resulting beam weight set may be associated with, a zeroing out amplitude, a full amplitude (e.g., 0 dB), and two quantization amplitudes (e.g., −3 dB and −1.5 dB). In some examples of using matrices $W_1$ and $W_2$, $N^2$ linear combinations of sampling beams 225 may be stored in the RFIC memory of the UE 115-*a*. As such, the UE 115-*a* may reuse various static beams which may reduce the number of stored linear combinations of sampling beams 225 by N, resulting in a storage expectation of $N^2-N$ units. Selecting beam weights with equal gain across each of the antenna elements 215 may increase gain which may lead to an increase in measurement accuracy when the associated channel experiences noise above a configured threshold.

In some examples, the matrix, may be an example of a size-4 Hadamard matrix. If a Hadamard matrix of size $2^{k-1}$ is known (denoted as $H_{2^{k-1}}$), then the Hadamard Matrix (W) may be constructed in accordance with Equation 3:

$$W = \begin{bmatrix} H_{2^{k-1}} & H_{2^{k-1}} \\ H_{2^{k-1}} & -H_{2^{k-1}} \end{bmatrix}$$

where the columns of matrix W may be used as respective sampling beams 225. In some examples, Hadamard matrix constructions may be available for relatively small antenna array 210 size dimensions and thus sampling beams 225 may be re-used from this set. For example, with reference to FIG. 2 in which N=4, multiple Hadamard matrix constructions may be possible.

Additionally, or alternatively, the UE 115-*a* may use a set of sampling beams 225 such that each of the antenna elements 215 is sampled separately. As such, the UE 115-*a* may use a set of sampling beams 225 in accordance with a matrix $W_3$ as denoted in Equation 4:

$$W_3 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

where the first column of matrix $W_3$ may equal $w_1$, the second column may equal $W_2$, the third column may equal $w_3$, and the fourth column may equal $w_4$. Based on matrix sampling each antenna element 215 separately, the resulting beam weight set may be associated with a zeroing out amplitude, a full amplitude (e.g., 0 dB), and one quantization amplitude (e.g., −1.5 dB). Based on a decrease in the number of quantization amplitudes, the use of matrix $W_3$ in the generation of the channel covariance matrix may benefit from an increase in efficiency.

Based on determining a set of sampling beams 225 (e.g., associated with matrix $W_1$, $W_2$, or $W_3$), the UE 115-a may proceed with a channel covariance matrix generation 245. In some examples, the UE 115-a may calculate, estimate, and approximate various entries of the channel covariance matrix based on a configured beam weight technique. In some examples, the UE 115-a may use a row or a column based technique as described herein, including with reference to channel covariance matrix 305-a of FIG. 3. In some examples, the UE 115-a may use a secondary/off diagonal technique as described herein, including with reference to channel covariance matrix 305-b of FIG. 3. In some examples, the UE 115-a may use an anchored adaptive index technique as described herein, including with reference to channel covariance matrix 305-c of FIG. 3. In some examples, the UE 115-a may determine which of the beam weight techniques to use in the generation of the channel covariance matrix based on receiving a beam weight technique message 235 from the node 205.

As such, the UE 115-a may receive one or more reference signals 240 from the node 205 using the determined linear combinations of sampling beams 225. Based on the RSRP associated with each of the reference signals 240 using each of the linear combinations of the sampling beams 225, the UE 115-a may initiate the channel covariance matrix generation 245 in accordance with the configured beam weight technique. In accordance with the various techniques for generating the channel covariance matrix, the UE may calculate one or more entries, estimate one or more entries, or both for the channel covariance matrix. For instance, the UE may calculate one or more first entries based on explicit measurements of the one or more reference signals 240 and estimate one or more second entries implicitly based on prior calculations associated with the channel covariance matrix. In some examples, the UE 115-a may use the generated channel covariance matrix to perform an adaptive beam weight generation 250. Based on performing the adaptive beam weight generation 250, the UE 115-a may determine a set of adaptive beam weights associated with respective antenna elements 215 of the antenna array 210.

In some examples, the UE 115-a may communicate with the node 205 in accordance with the generated adaptive beam weights. For example, the UE 115-a may transmit one or more uplink messages 255 to the node 205, receive one or more downlink messages 260 from the node 205, or both using the generated adaptive beam weights.

Figure 3:
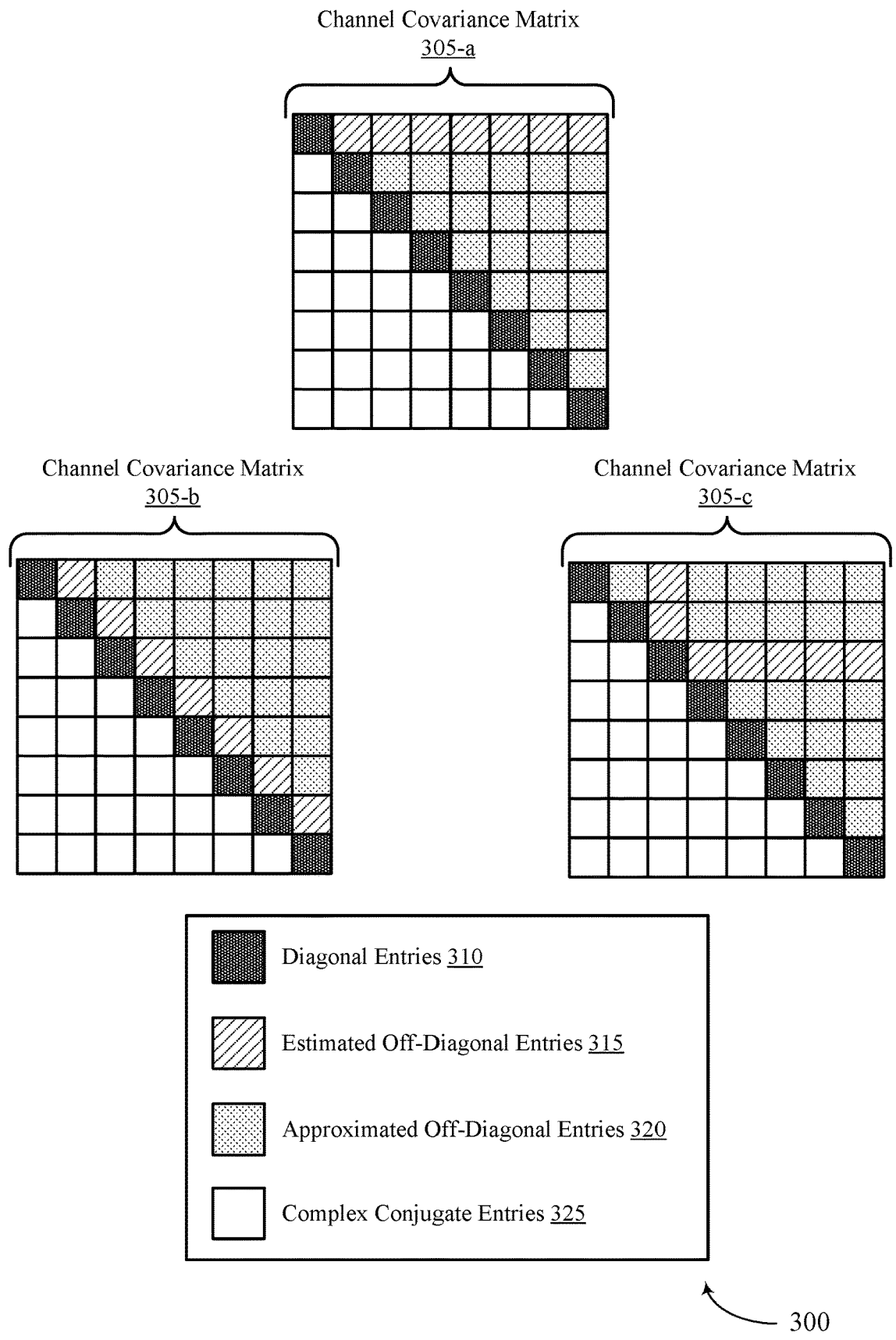
FIG. 3 illustrates an example of a channel covariance matrix generation that supports channel statistics based adaptive beam weight estimation in accordance with one or more aspects of the present disclosure.

FIG. 3 illustrates an example of a channel covariance matrix generation 300 that supports channel statistics based adaptive beam weight estimation in accordance with one or more aspects of the present disclosure. In some examples, the channel covariance matrix generation 300 may implement one or more aspects of wireless communications system 100 and wireless communications system 200. For instance, the channel covariance matrix generation 300 may be an example of channel covariance matrix generation 245, as described with reference to FIG. 2. While examples are discussed herein, any number of devices and device types may be used to accomplish implementations described in the present disclosure. For example, the channel covariance matrix generation 300 may support various channel covariance matrix generation techniques that a UE 115 may utilize to generate adaptive beam weights during wireless communications.

In some examples of channel covariance matrix generation 300, the UE 115 may calculate the diagonal entries 310 for the channel covariance matrices 305-a through 305-c. In some examples, the UE 115 may calculate the diagonal entries 310 using a set of sampling beams (e.g., $w_1, w_1, \ldots, w_N$) and estimate a set of RSRPs (e.g., $R_1, \ldots, R_N$) associated with a set of reference signals received using the sampling beams. As illustrated in FIG. 3, the channel covariance matrices 305-a through 305-c may each have an associated N-value of 8; however, it is understood that a channel covariance matrix 305 may have an associated N-value of any integer value. For example, calculating each diagonal entry 310 ($D_n$) of a channel covariance matrix 305 may be generalized for any N-value using Equation 5:

$$D_n = w_n^H R w_n; n = 1, \ldots, N$$

Based on generating the diagonal entries 310 of a channel covariance matrix 305, the UE 115 may use one of various techniques to generate estimated off-diagonal entries 315 and approximated off-diagonal entries 320 of the channel covariance matrix 305. For example, the UE 115 may generate the off-diagonal entries of the channel covariance matrix 305-a in accordance with a row or column based technique. In some examples, the row or column based technique may be an example of a fixed approximation technique for estimating a given row or column of a channel covariance matrix 305. To generate the estimated off-diagonal entries 315, the UE 115 may fix a k*-value for the channel covariance matrix 305-a, where k* may be either a row or a column associated with a diagonal entry 310. For instance, with reference to the channel covariance matrix 305-a, k*=1 such that k* is associated with the first row of channel covariance matrix 305-a. As such, the UE 115 may select 2(N−1) beams to estimate each of the entries associated with the k*-value. For example, the UE 115 may use linear combinations of the set sampling beams to generate the estimated off-diagonal entries 315 (e.g., $w_{k^*}+w_1$, $w_{k^*}+iw_1, \ldots, w_{k^*}+w_{k^*-1}$, and $w_{k^*}+iw_{k^*-1}$ as well as $w_{k^*}+w_{k^*+1}$ and $w_{k^*}+iw_{k^*+1}, \ldots, w_{k^*}+w_N$ and $w_{*k}+iw_N$). Generating each estimated off-diagonal entry 315 (e.g., $EOD_n$) using the row or column technique may be generalized using Equation 6:

$$EOD_n = w_{k^*}^H R w_n; n \neq k^*.$$

In some examples, the value of k* may be pre-determined, configured by the UE 115, configured by an associated node (e.g., the node 205 with reference to FIG. 2), or based on a rule defined by a network associated with the UE 115. In some cases, the channel covariance matrix 305-a may have an associated latency related to the number of reference signals used for generating the diagonal entries 310 and the estimated off-diagonal entries 315. For instance, calculating the diagonal entries 310 may use N reference signals and calculating the estimated off-diagonal entries 315 may use 2(N−1) reference signals, which may result in a total of 3N−2 reference signals used for generating the channel covariance matrix 305-a.

In some examples, the UE 115 may approximate the remaining off-diagonal entries of the channel covariance matrix 305-a using the diagonal entries 310 and the estimated off-diagonal entries 315. For example, the UE 115 may generate the approximated off-diagonal entries 320 of the channel covariance matrix in accordance with Equation 7:

$$w_k^H R w_n \approx \frac{w_k^H R w_{k^*} \cdot w_{k^*}^H R w_n}{w_{k^*}^H R w_{k^*}}; k \neq k^*.$$

Using Equations 5-7, the UE 115 may generate the upper triangular entries of the channel covariance matrix 305-a. In some examples, the lower triangular entries may have a complex conjugate relationship to the upper triangular entries. As such, the UE 115 may generate complex conjugate entries 325 for the lower triangular entries of the channel covariance matrix 305-a.

Additionally, or alternatively, the UE 115 may generate the off-diagonal entries of the channel covariance matrix 305-b in accordance with a secondary diagonal technique. In some examples, the secondary diagonal technique may be an example of a fixed approximation technique for estimating a secondary diagonal entries (e.g., the estimated off-diagonal entries 315) of a channel covariance matrix 305. To generate the estimated off-diagonal entries 315, the UE 115 may consider terms of the form $w_k + w_{k+1}$ and $w_k + i w_{k+1}$ for k=1, ..., N−1. As such, the UE 115 may select 2(N−1) beams to estimate each of the secondary diagonal entries. Generating each estimated off-diagonal entry 315 (e.g., $EOD_n$) using the secondary diagonal technique may be generalized in accordance with Equation 8:

$$EOD_n = w_k^H R w_{k+1}; k=1, \ldots, N-1.$$

In some cases, the channel covariance matrix 305-b may have an associated latency related to the number of reference signals used for generating the diagonal entries 310 and the estimated off-diagonal entries 315. For instance, calculating the diagonal entries 310 may use N reference signals and calculating the estimated off-diagonal entries 315 may use 2(N−1) reference signals, which may result in a total of 3N−2 reference signals used for generating the channel covariance matrix 305-b.

In some examples, the UE 115 may approximate the remaining off-diagonal entries of the channel covariance matrix 305-b using the diagonal entries 310 and the estimated off-diagonal entries 315. For example, the UE 115 may generate the approximated off-diagonal entries 320 of the channel covariance matrix 305-b in accordance with Equation 9:

$$w_k^H R w_n \approx \frac{\prod_{i=k}^{n-1} w_i^H R w_{i+1}}{\prod_{i=k+1}^{n-1} w_i^H R w_i}; n \geq k+2.$$

Using Equations 5, 8, and 9 the UE 115 may generate the upper triangular entries of the channel covariance matrix 305-b. In some examples, the lower triangular entries may have a complex conjugate relationship to the upper triangular entries. As such, the UE 115 may generate complex conjugate entries 325 for the lower triangular entries of the channel covariance matrix 305-b.

Additionally, or alternatively, the UE 115 may generate the off-diagonal entries of the channel covariance matrix 305-c in accordance with an anchored adaptive index technique. In some examples, the anchored adaptive index technique may be an example of an adaptive approximation technique for estimating a set of entries associated with a row and column of a determined diagonal entry 310 of the channel covariance matrix 305-c (e.g., a diagonal entry 310 anchor). In some examples, the UE 115 may determine which diagonal entry 310 is the anchor based on which diagonal entry 310 has a largest associated RSRP (e.g., $R_i$). As such, the UE 115 may set the k*-value equal to the index associated with $R_i$, (e.g., index i) and estimate the row and column entries anchored to k* (e.g., the estimated off-diagonal entries 315). For instance, with reference to the channel covariance matrix 305-c, k*=3 such that the estimated off-diagonal entries 315 are the entries of the row and columns anchored to k*. Generating each estimated off-diagonal entry 315 (e.g., EON using the secondary diagonal technique may be generalized using Equation 10:

$$EOD_i = w_{k^*}^H R w_i; i \geq k^*+1$$

$$EOD_i = w_i^H R w_{k^*}; i \leq k^*-1.$$

In some cases, the channel covariance matrix 305-c may have an associated latency related to the number of reference signals used for generating the diagonal entries 310 and the estimated off-diagonal entries 315. For instance, calculating the diagonal entries 310 may use N reference signals, calculating the estimated off-diagonal entries 315 in the column space may use k*−1 reference signals, and calculating the estimated off-diagonal entries 315 in the row space may use N−k* reference signals, which may result in a total of 3N−2 reference signals used for generating the channel covariance matrix 305-c.

In some examples, the UE 115 may approximate the remaining off-diagonal entries of the channel covariance matrix 305-b using the diagonal entries 310 and the estimated off diagonal entries 315 (e.g., the approximated off-diagonal entries 320). Using Equations 5 and 10, the UE 115 may generate the upper triangular entries of the channel covariance matrix 305-b. In some examples, the lower triangular entries may have a complex conjugate relationship to the upper triangular entries. As such, the UE 115 may generate complex conjugate entries 325 for the lower triangular entries of the channel covariance matrix 305-c.

In some examples of channel covariance matrix generation 300, the UE 115 may artificially zero out one or more entries of a channel covariance matrix 305. Further discussion of artificially zeroing out entries of a channel covariance matrix 305 is described herein, including with reference to FIG. 4.

Figure 4:
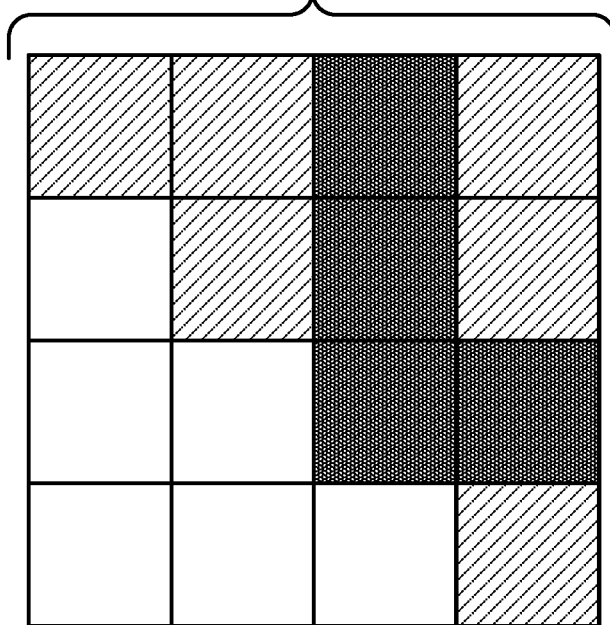
FIG. 4 illustrates an example of a channel covariance matrix generation that supports channel statistics based adaptive beam weight estimation in accordance with one or more aspects of the present disclosure.
Figure 4:
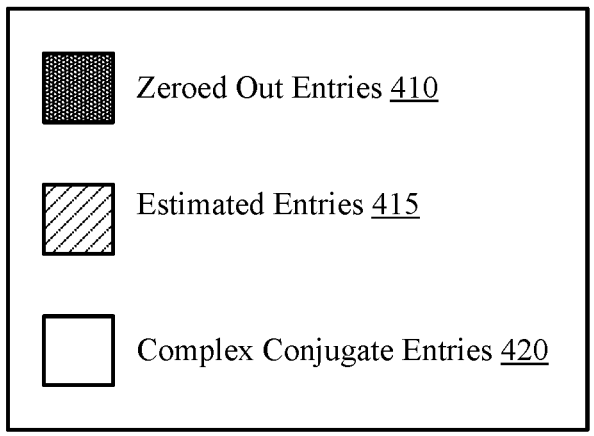

FIG. 4 illustrates an example of a channel covariance matrix generation 400 that supports channel statistics based adaptive beam weight estimation in accordance with one or more aspects of the present disclosure. In some examples, the channel covariance matrix generation 400 may implement one or more aspects of wireless communications system 100, wireless communications system 200, and channel covariance matrix generation 300. For instance, channel covariance matrix 405 may be generated using techniques used for generating the channel covariance matrix 305-a, 305-b, or 305-c as described with reference to FIG. 3. While examples are discussed herein, any number of devices and device types may be used to accomplish implementations described in the present disclosure. For example, the channel covariance matrix generation 400 may support various channel covariance matrix generation techniques that a UE 115 may utilize to generate adaptive beam weights during wireless communications.

As illustrated in FIG. 4, the channel covariance matrix 405 may have an associated N-value of 4. As such, the UE 115 may use a set of sampling beams (e.g., $w_1$, $w_2$, $w_3$, and $W_4$) to generate a set of estimated entries 415 for the channel covariance matrix 405. In some cases, however, one or more sampling beams may generate associated estimated entries 415 that are below a configured quality threshold. For example, with reference to the channel covariance matrix 405, the diagonal entry and off-diagonal entries associated with the sampling beam $w_3$, may be below the configured threshold. As such, the UE 115 may determine to refrain from using the sampling beam w 3 or linear combinations of beams that include the sampling beam $w_3$. For example, the UE 115 may generate the channel covariance matrix 405 using beams of the form: $w_1$, $w_2$, $w_4$, $w_1+w_2$, $w_1+iw_2$, $w_1+w_4$, $w_1+iw_4$, $w_2+w_4$, $w_2+iw_4$.

Based on refraining from using the sampling beam for channel covariance matrix generation 400, the UE 115 may artificially zero out entries associated with the sampling beam $w_3$. As such, the UE 115 may generate zeroed out entries 410. In some examples, the lower triangular entries may have a complex conjugate relationship to the upper triangular entries of the channel covariance matrix 405. As such, the UE 115 may generate complex conjugate entries 420 for the lower triangular entries of the channel covariance matrix 405.

Figure 5:
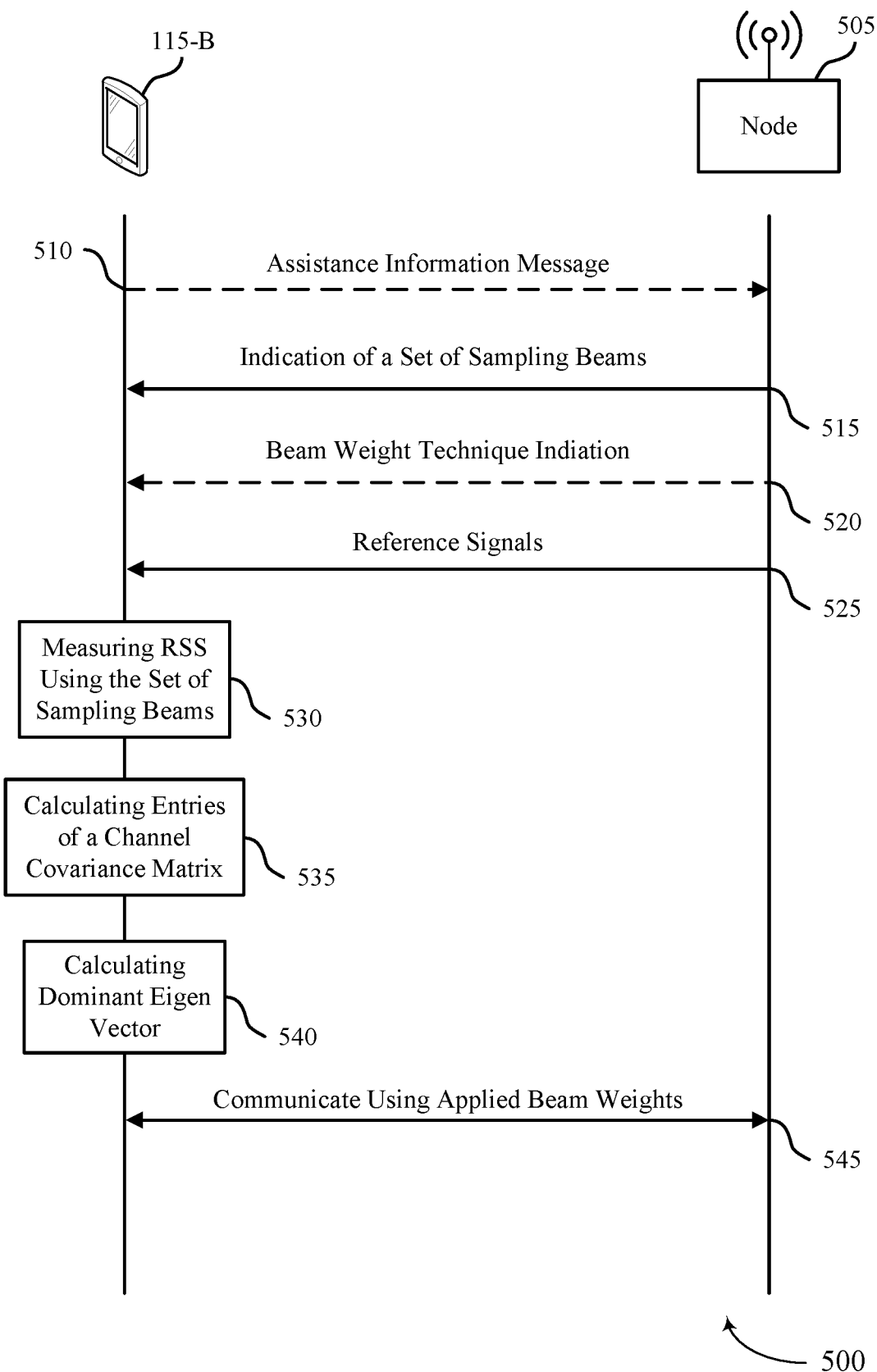
FIG. 5 illustrates an example of a process flow that supports channel statistics based adaptive beam weight estimation in accordance with one or more aspects of the present disclosure.

FIG. 5 illustrates an example of a process flow 500 that supports channel statistics based adaptive beam weight estimation in accordance with one or more aspects of the present disclosure. In some examples, process flow 500 may implement aspects of wireless communications system 100, wireless communications system 200, channel covariance matrix generation 300, channel covariance matrix generation 400, or a combination thereof. Process flow 500 includes a node 205 505 which may be an example of node 205 and a UE 115-b which may be an example of a UE 115 with reference FIGS. 1 through 4. In some examples, the node 205 505 may be an example of a second UE 115 or a network entity 105. Alternative examples of the following may be implemented, where some steps are performed in a different order than described or are not performed at all. In some cases, steps may include additional features not mentioned below, or further steps may be added. In addition, while process flow 500 shows processes between a node 205 505 and a UE 115, it should be understood that these processes may occur between any number of network devices.

At 510, the UE 115-b may transmit an assistance information message to the node 205. In some examples, the assistance information message may indicate a set of sampling beams defined for the UE 115-b for use in adaptive beam generation. In some examples, the sampling beams defined for the UE 115-b may be based on a capability of the set of sampling beams to minimize a mean squared error in calculating a set of entries of a channel covariance matrix, an amplitude control capability of the UE 115-b associated with generating a set of linear combinations of the sampling beams from the set of sampling beams, and a storage capacity of an RFIC memory of the UE 115-b.

At 515, the UE 115-b may receive a control message indicating a set of sampling beams defined for the UE 115-b. In some examples, the control message may be received based on the UE 115-b transmitting the assistance information message at 510. In some examples, one or more beams of the set of sampling beams may be defined by a set of columns of a unitary matrix. In some examples, one or more beams of the set of sampling beams may be defined by selecting a single antenna from a set of antenna elements of an antenna array associated with the UE 115-b.

At 520, the UE 115-b may receive a control message indicating a beam weight technique for use in generating the channel covariance matrix. For example, the control message may indicate a technique for determining the first set of off-diagonal entries to be calculated in the channel covariance matrix. In some examples, a technique may be chosen from a set of techniques where a first technique may be based on a fixed row or a fixed column of the channel covariance matrix, a second technique may be based on calculating a secondary diagonal of the channel covariance matrix, and a third technique may be based on a row and a column anchored to a diagonal entry of the set of diagonal entries of the channel covariance matrix. In some examples, the technique is defined at the UE 115-b according to one or more of control signaling received from the node 205, a priori rule stored at the UE 115-b, or both.

At 525, the UE 115-b may receive one or more reference signals from the node 205. In some examples, the UE 115-b may receive the one or more reference signals using the set of defined sampling beams. At 530, the UE 115-b may measure a set of received signal strengths for each of the one or more reference signals using linear combinations of sampling beams from the set of sampling beams. In some examples, the set of received signal strengths may be associated with a single or multiple subcarriers and communications with the node 205 may occur over multiple subcarriers.

At 535, the UE 115-b may calculate a set of entries of the channel covariance matrix based on the set of received signal strengths of the linear combinations of sampling beams from the set of sampling beams defined for the UE 115-b. For example, the UE 115-b may calculate a set of diagonal entries of the channel covariance matrix based on the set of sampling beams, calculate a first set of off-diagonal entries of the channel covariance matrix, where each of the first set of off-diagonal entries may be calculated using the received signal strengths of the linear combinations of the sampling beams, and estimate a second set of off-diagonal entries of the channel covariance matrix that may be different from the first set of off-diagonal entries based on the calculated first set of off-diagonal entries and the calculated set of diagonal entries. In some examples, the UE 115-b may set a second portion of the channel covariance matrix to zero.

At 540, the UE 115-b may calculate a dominant eigenvector of the channel covariance matrix based on the calculated set of diagonal entries, the calculated first set of off-diagonal entries, the estimated second set of off-diagonal entries, or a combination thereof. In some examples, a set of adaptive beam weights may be selected according to the dominant eigenvector.

At 545, the UE 115-b may communicate with the node 205 using the set of adaptive beam weights over the antenna array of the UE 115-b. In some examples, each beam weight of the set of beam weights may be associated with a respective entry of a channel covariance matrix, and a portion of the channel covariance matrix may be based on linear combinations of sampling beams from the set of sampling beams defined for the UE 115-b.

In some examples, the node 205 may be an example of a second UE 115. In such examples, the UE 115-b may transmit to the node 205 via sidelink, an indication of the set of adaptive beam weights used for communicating with the node 205 and may receive from the node 205 via sidelink an indication of a second set of adaptive beam weights used at the node 205 for communication with the UE 115-b.

Figure 6:
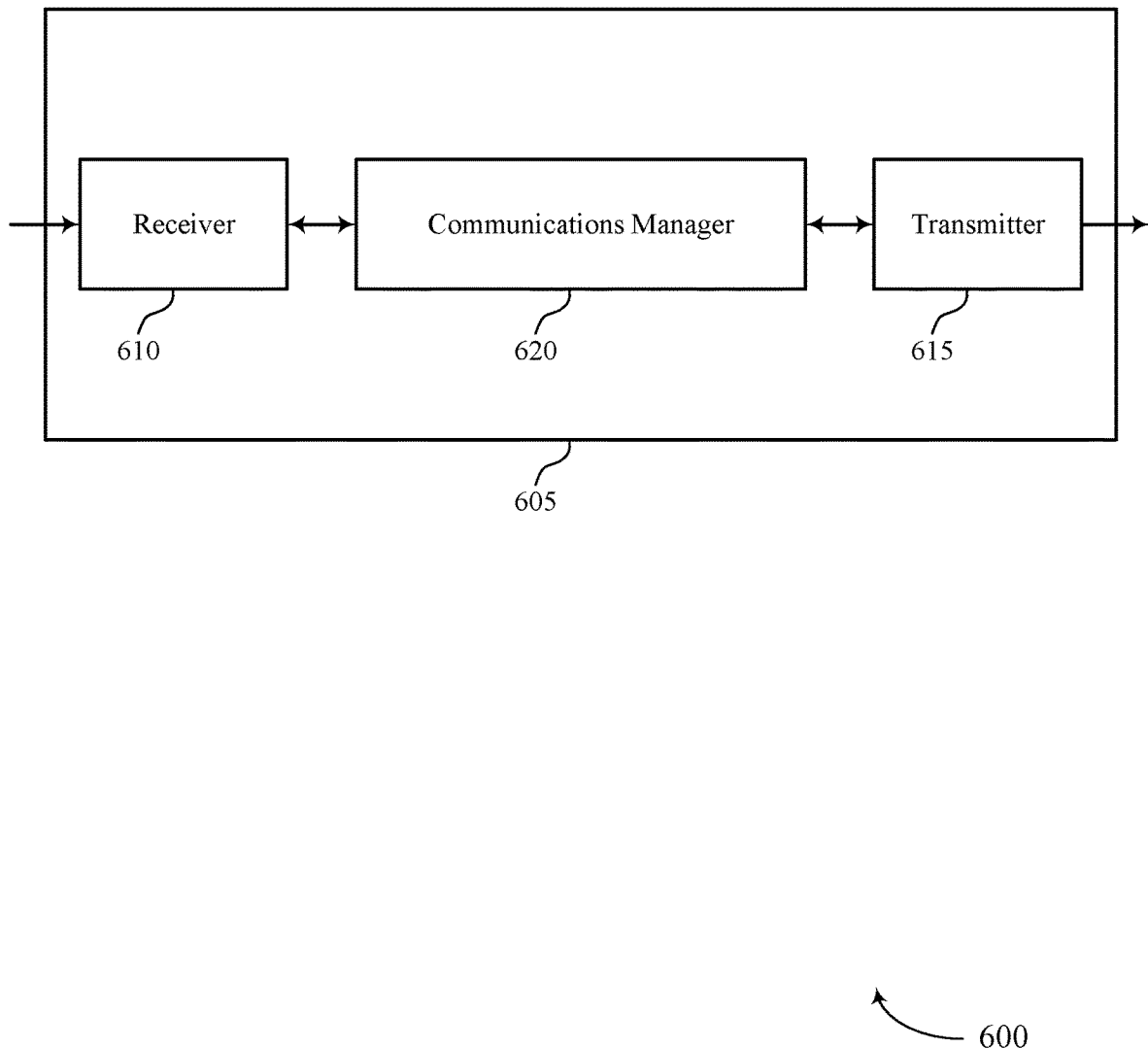
FIGS. 6 and 7 show block diagrams of devices that support channel statistics based adaptive beam weight estimation in accordance with one or more aspects of the present disclosure.

FIG. 6 shows a block diagram 600 of a device 605 that supports channel statistics based adaptive beam weight estimation in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel statistics based adaptive beam weight estimation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel statistics based adaptive beam weight estimation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel statistics based adaptive beam weight estimation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 may be configured as or otherwise support a means for measuring a set of received signal strengths for communications from a wireless node corresponding to a set of multiple linear combinations of sampling beams from a set of sampling beams, where the set of sampling beams are defined for the UE. The communications manager 620 may be configured as or otherwise support a means for calculating a set of entries of a channel covariance matrix based on the set of received signal strengths of the set of multiple linear combinations of the sampling beams from the set of sampling beams defined for the UE. The communications manager 620 may be configured as or otherwise support a means for communicating with the wireless node based on applying a set of beam weights to an antenna array of the UE, where the set of beam weights are based on the channel covariance matrix.

Additionally, or alternatively, the communications manager 620 may support wireless communications in accordance with examples as disclosed herein. For example, the communications manager 620 may be configured as or otherwise support a means for receiving, at the UE, a control message indicating a set of sampling beams defined for the UE. The communications manager 620 may be configured as or otherwise support a means for communicating with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for adaptive beam weight implementation for beamforming communication which may result in, a more efficient utilization of communication resources and an increase in signal reliability.

Figure 7:
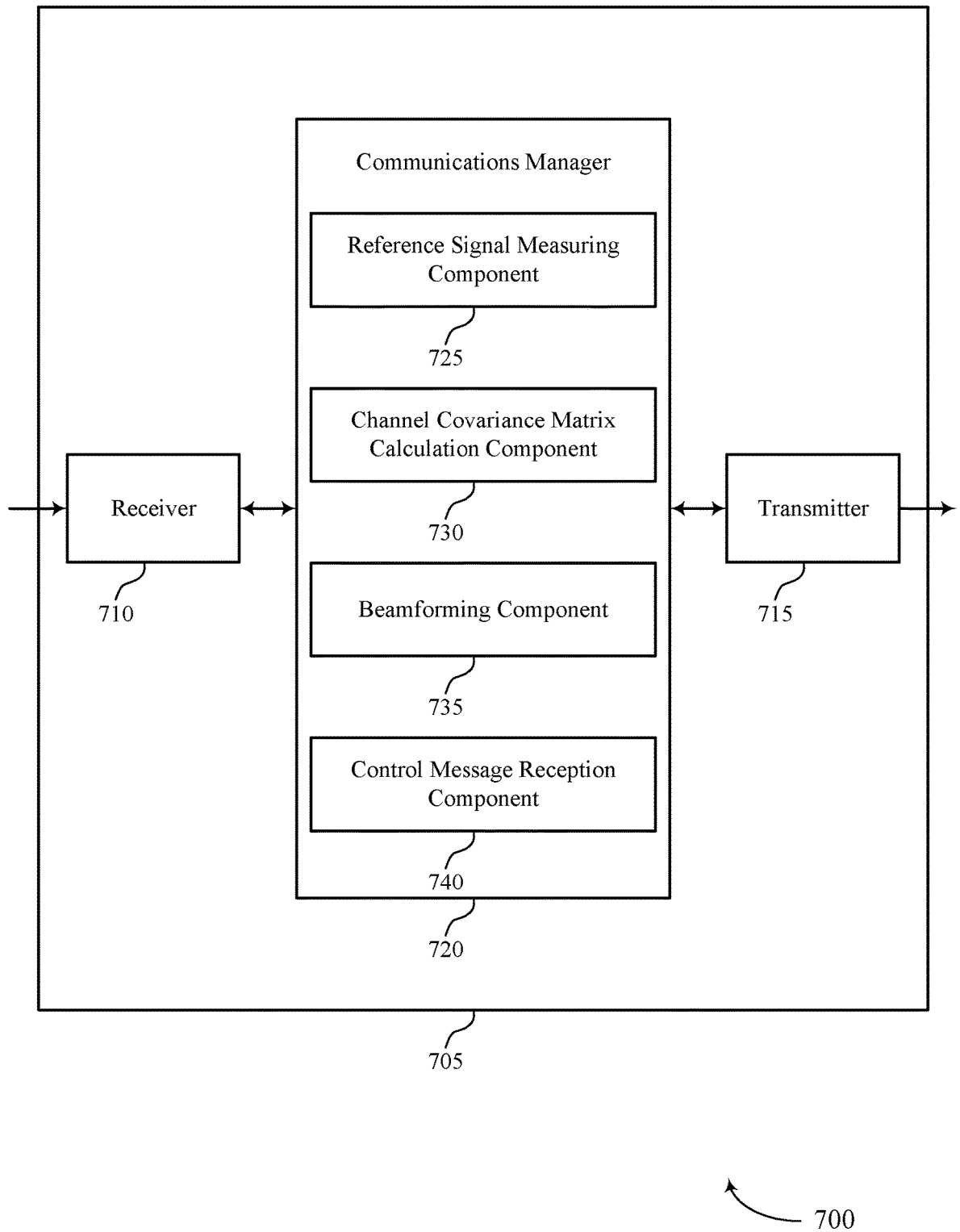

FIG. 7 shows a block diagram 700 of a device 705 that supports channel statistics based adaptive beam weight estimation in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel statistics based adaptive beam weight estimation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel statistics based adaptive beam weight estimation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel statistics based adaptive beam weight estimation as described herein. For example, the communications manager 720 may include a reference signal measuring component 725, a channel covariance matrix calculation component 730, a beamforming component 735, a control message reception component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The reference signal measuring component 725 may be configured as or otherwise support a means for measuring a set of received signal strengths for communications from a wireless node corresponding to a set of multiple linear combinations of sampling beams from a set of sampling beams, where the set of sampling beams are defined for the UE. The channel covariance matrix calculation component 730 may be configured as or otherwise support a means for calculating a set of entries of a channel covariance matrix based on the set of received signal strengths of the set of multiple linear combinations of the sampling beams from the set of sampling beams defined for the UE. The beamforming component 735 may be configured as or otherwise support a means for communicating with the wireless node based on applying a set of beam weights to an antenna array of the UE, where the set of beam weights are based on the channel covariance matrix.

Additionally, or alternatively, the communications manager 720 may support wireless communications in accordance with examples as disclosed herein. The control message reception component 740 may be configured as or otherwise support a means for receiving, at the UE, a control message indicating a set of sampling beams defined for the UE. The beamforming component 735 may be configured as or otherwise support a means for communicating with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE.

Figure 8:
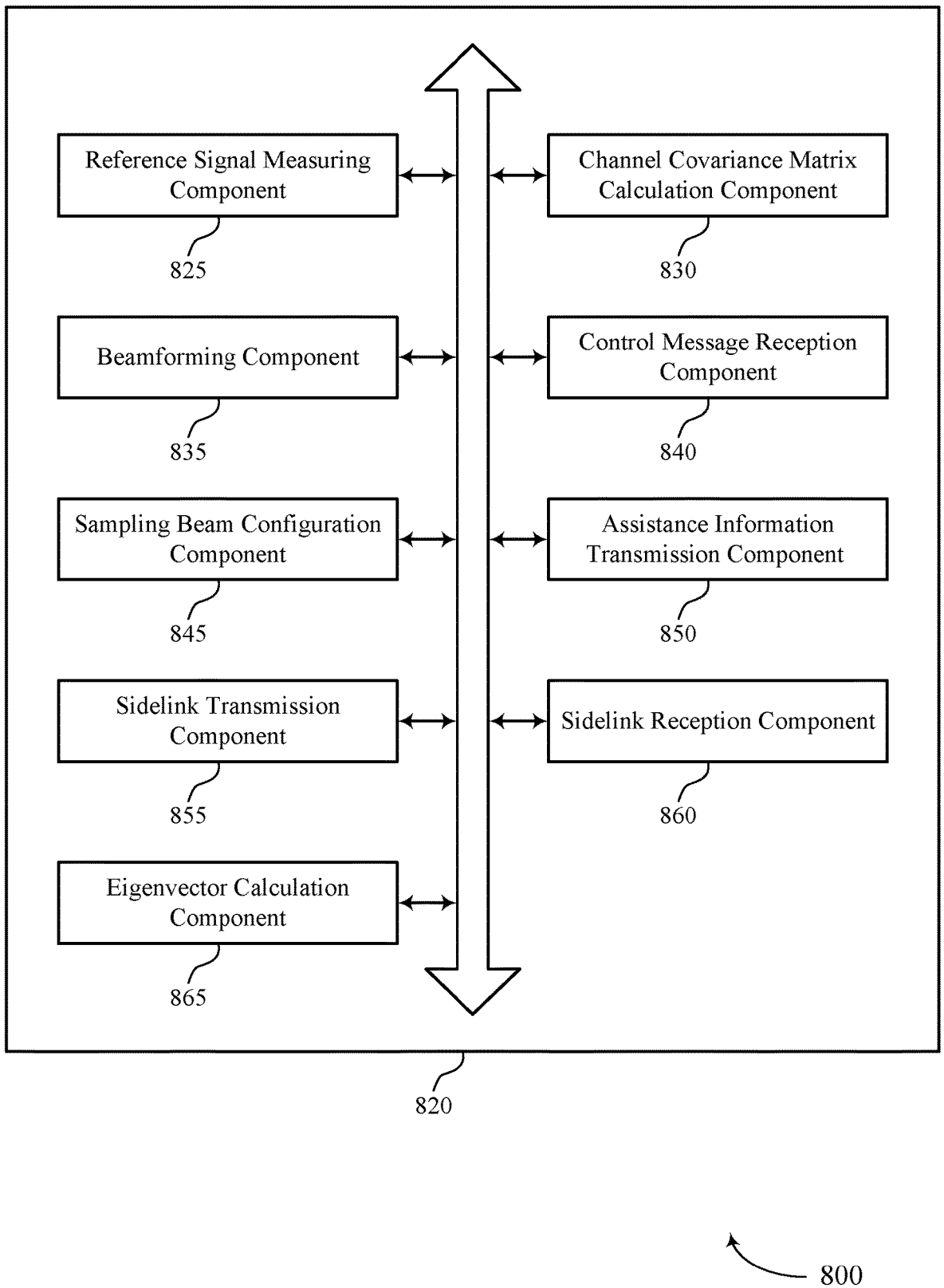
FIG. 8 shows a block diagram of a communications manager that supports channel statistics based adaptive beam weight estimation in accordance with one or more aspects of the present disclosure.

FIG. 8 shows a block diagram 800 of a communications manager 820 that supports channel statistics based adaptive beam weight estimation in accordance with one or more aspects of the present disclosure. The communications manager 820 may be an example of aspects of a communications manager 620, a communications manager 720, or both, as described herein. The communications manager 820, or various components thereof, may be an example of means for performing various aspects of channel statistics based adaptive beam weight estimation as described herein. For example, the communications manager 820 may include a reference signal measuring component 825, a channel covariance matrix calculation component 830, a beamforming component 835, a control message reception component 840, a sampling beam configuration component 845, an assistance information transmission component 850, a sidelink transmission component 855, a sidelink reception component 860, an eigenvector calculation component 865, or any combination thereof. Each of these components may communicate, directly or indirectly, with one another (e.g., via one or more buses).

The communications manager 820 may support wireless communications in accordance with examples as disclosed herein. The reference signal measuring component 825 may be configured as or otherwise support a means for measuring a set of received signal strengths for communications from a wireless node corresponding to a set of multiple linear combinations of sampling beams from a set of sampling beams, where the set of sampling beams are defined for the UE. The channel covariance matrix calculation component 830 may be configured as or otherwise support a means for calculating a set of entries of a channel covariance matrix based on the set of received signal strengths of the set of multiple linear combinations of the sampling beams from the set of sampling beams defined for the UE. The beamforming component 835 may be configured as or otherwise support a means for communicating with the wireless node based on applying a set of beam weights to an antenna array of the UE, where the set of beam weights are based on the channel covariance matrix.

In some examples, the control message reception component 840 may be configured as or otherwise support a means for receiving a control message from the wireless node indicating or configuring the set of sampling beams defined for the UE.

In some examples, to support calculating the set of entries of the channel covariance matrix, the channel covariance matrix calculation component 830 may be configured as or otherwise support a means for calculating a set of diagonal entries of the channel covariance matrix based on the set of sampling beams. In some examples, to support calculating the set of entries of the channel covariance matrix, the channel covariance matrix calculation component 830 may be configured as or otherwise support a means for calculating a first set of off-diagonal entries of the channel covariance matrix, where each of the first set of off-diagonal entries is calculated using the set of received signal strengths of the set of multiple linear combinations of the sampling beams. In some examples, to support calculating the set of entries of the channel covariance matrix, the channel covariance matrix calculation component 830 may be configured as or otherwise support a means for estimating a second set of off-diagonal entries of the channel covariance matrix that are different from the first set of off-diagonal entries based on the calculated first set of off-diagonal entries and the calculated set of diagonal entries.

In some examples, the control message reception component 840 may be configured as or otherwise support a means for receiving a control message indicating a technique for determining the first set of off-diagonal entries to be calculated in the channel covariance matrix, where the technique is from a set of techniques including: a first technique based on a fixed row or a fixed column of the channel covariance matrix, a second technique based on calculating a secondary diagonal of the channel covariance matrix, and a third technique based on a row and a column anchored to a diagonal entry of the set of diagonal entries of the channel covariance matrix.

In some examples, the technique is defined according to one or more of control signaling received from the wireless node, a priori rule stored at the UE, or both.

In some examples, the eigenvector calculation component 865 may be configured as or otherwise support a means for calculating a dominant eigenvector of the channel covariance matrix based on one or more of: the calculated set of diagonal entries, the calculated first set of off-diagonal entries, or the estimated second set of off-diagonal entries, where the set of beam weights is selected according to the dominant eigenvector.

In some examples, the calculated set of diagonal entries, and the channel covariance matrix calculation component 830 may be configured as or otherwise support a means for setting a second portion of the channel covariance matrix to zero.

In some examples, the set of received signal strengths corresponds to a single or multiple subcarriers and the communicating with the wireless node occurs over multiple subcarriers.

In some examples, one or more beams of the set of sampling beams are defined by a set of columns of a unitary matrix.

In some examples, one or more beams of the set of sampling beams are defined by selecting a single antenna from a set of antenna elements of the antenna array.

In some examples, the wireless node is a network entity or a second UE.

In some examples, a capability of the set of sampling beams to minimize a mean squared error in calculating the set of entries of the channel covariance matrix, an amplitude control capability of the UE associated with generating the set of multiple linear combinations of the sampling beams from the set of sampling beams, and a storage capacity of an RFIC memory of the UE.

Additionally, or alternatively, the communications manager 820 may support wireless communications in accordance with examples as disclosed herein. The control message reception component 840 may be configured as or otherwise support a means for receiving, at the UE, a control message indicating a set of sampling beams defined for the UE. In some examples, the beamforming component 835 may be configured as or otherwise support a means for communicating with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE.

In some examples, the control message reception component 840 may be configured as or otherwise support a means for receiving a second control message indicating a technique for calculating a first set of off-diagonal entries of the channel covariance matrix, where the technique is from a set of techniques including: a first technique based on a fixed row or column of the channel covariance matrix, a second technique based on calculating a secondary diagonal of the channel covariance matrix, and a third technique based on a row and a column anchored to a diagonal entry of a set of diagonal entries of the channel covariance matrix.

In some examples, the wireless node is a network entity or a second UE.

In some examples, the assistance information transmission component 850 may be configured as or otherwise support a means for transmitting an assistance information message indicating the set of sampling beams defined for the UE, where the control message is received based on the assistance information message.

In some examples, the sidelink transmission component 855 may be configured as or otherwise support a means for transmitting to a second UE via sidelink, an indication of the set of beam weights used for communicating with the second UE. In some examples, the sidelink reception component 860 may be configured as or otherwise support a means for receiving, from the second UE via sidelink, an indication of a second set of beam weights used at the second UE for communication with the UE.

In some examples, the set of sampling beams is based on one or more of a capability of the sampling beams to minimize a mean squared error in calculating a set of entries of the channel covariance matrix, an amplitude control capability of the UE associated with the linear combinations of the sampling beams, or a storage capacity of a RFIC memory of the UE.

Figure 9:
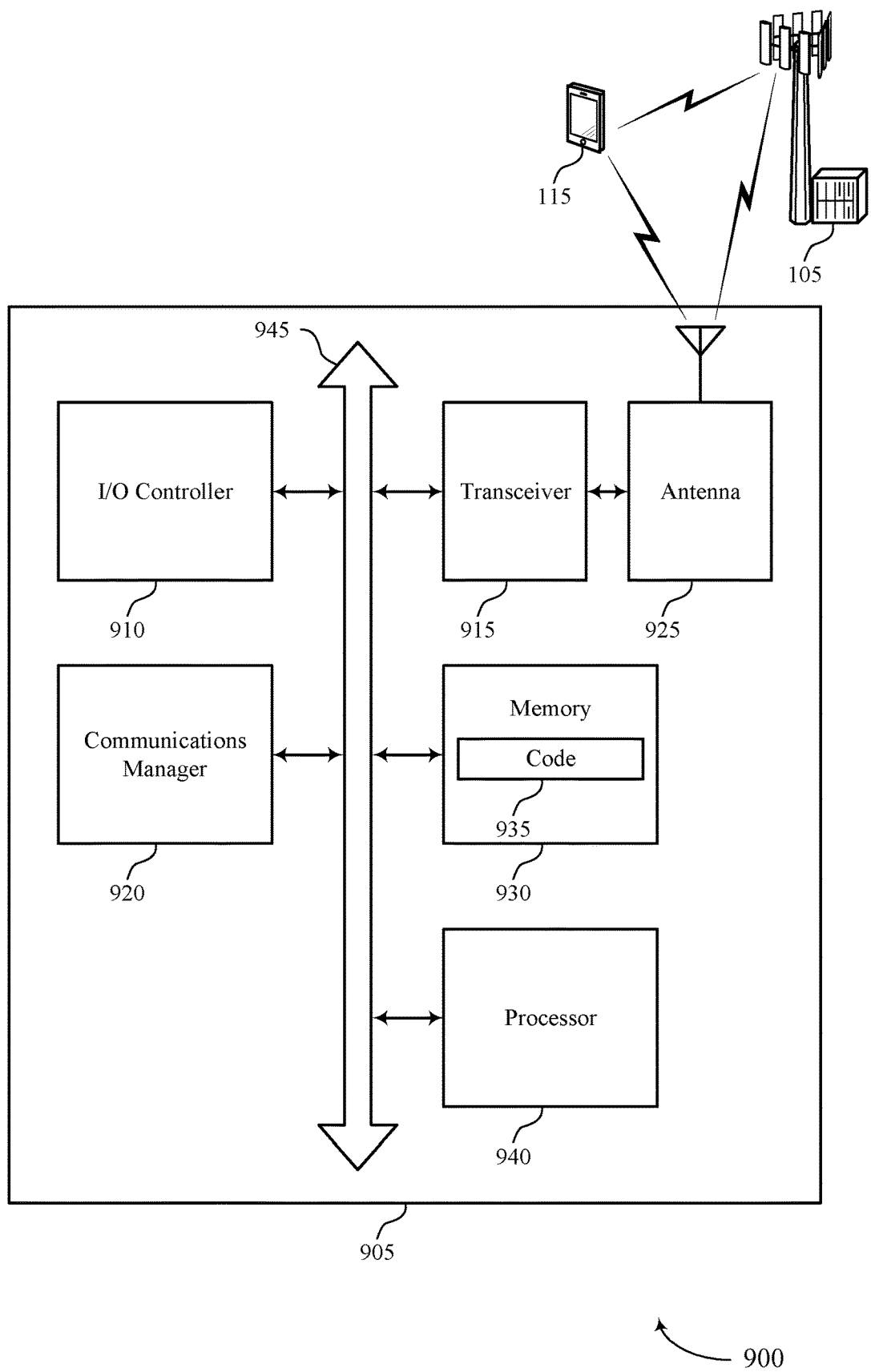
FIG. 9 shows a diagram of a system including a device that supports channel statistics based adaptive beam weight estimation in accordance with one or more aspects of the present disclosure.

FIG. 9 shows a diagram of a system 900 including a device 905 that supports channel statistics based adaptive beam weight estimation in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel statistics based adaptive beam weight estimation). For example, the device 905 or a component of the device 905 may include a processor 940 and memory 930 coupled with or to the processor 940, the processor 940 and memory 930 configured to perform various functions described herein.

The communications manager 920 may support wireless communications in accordance with examples as disclosed herein. For example, the communications manager 920 may be configured as or otherwise support a means for measuring a set of received signal strengths for communications from a wireless node corresponding to a set of multiple linear combinations of sampling beams from a set of sampling beams, where the set of sampling beams are defined for the UE. The communications manager 920 may be configured as or otherwise support a means for calculating a set of entries of a channel covariance matrix based on the set of received signal strengths of the set of multiple linear combinations of the sampling beams from the set of sampling beams defined for the UE. The communications manager 920 may be configured as or otherwise support a means for communicating with the wireless node based on applying a set of beam weights to an antenna array of the UE, where the set of beam weights are based on the channel covariance matrix.

Additionally, or alternatively, the communications manager 920 may support wireless communications in accordance with examples as disclosed herein. For example, the communications manager 920 may be configured as or otherwise support a means for receiving, at the UE, a control message indicating a set of sampling beams defined for the UE. The communications manager 920 may be configured as or otherwise support a means for communicating with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE.

By including or configuring the communications manager 920 in accordance with examples as described herein, the device 905 may support techniques for may support techniques for adaptive beam weight implementation for beamforming communication which may result in, a more efficient utilization of communication resources, an increase in signal reliability, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of channel statistics based adaptive beam weight estimation as described herein, or the processor 940 and the memory 930 may be otherwise configured to perform or support such operations.

Figure 10:
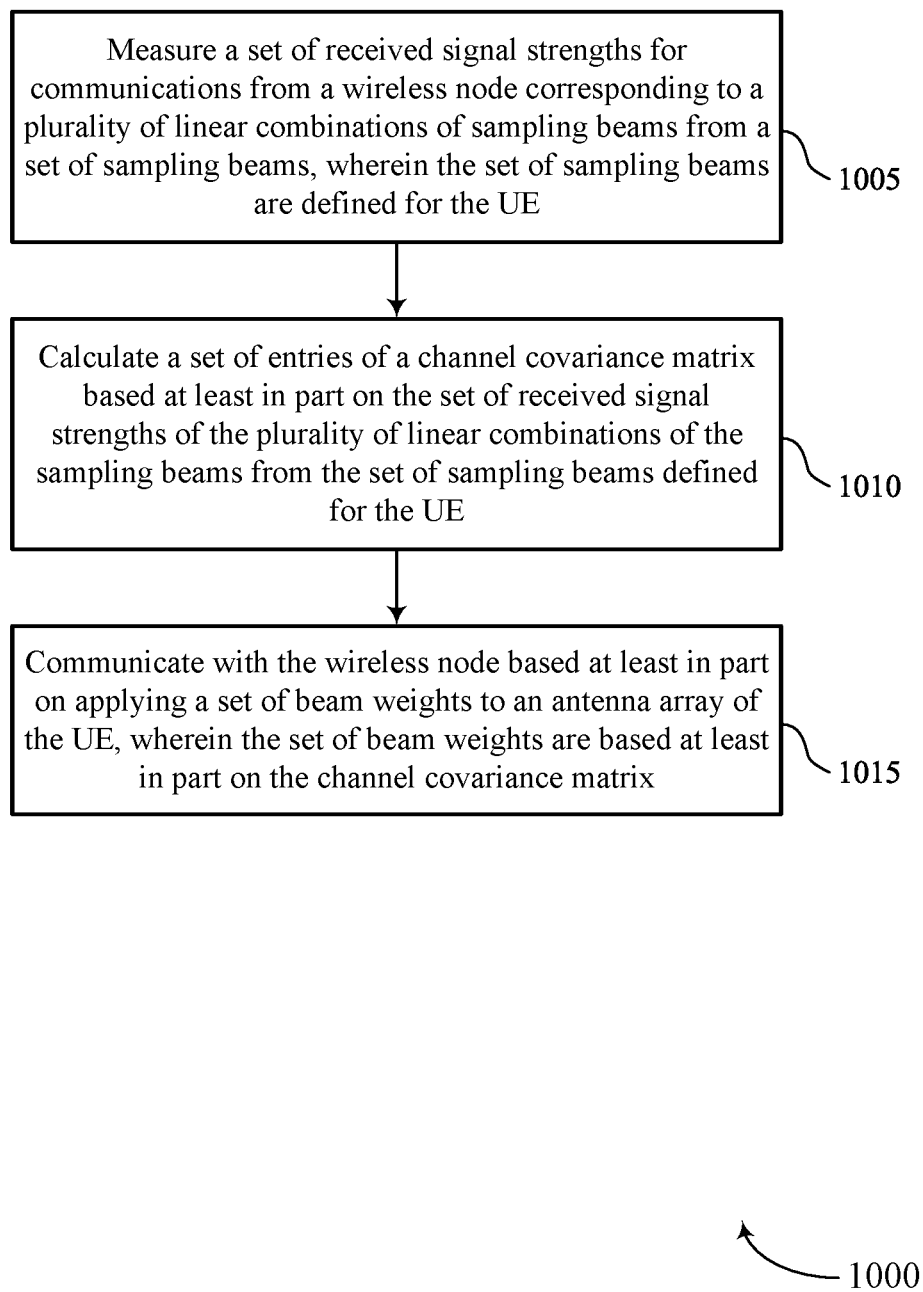
FIGS. 10 through 13 show flowcharts illustrating methods that support channel statistics based adaptive beam weight estimation in accordance with one or more aspects of the present disclosure.

FIG. 10 shows a flowchart illustrating a method 1000 that supports channel statistics based adaptive beam weight estimation in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include measuring a set of received signal strengths for communications from a wireless node corresponding to a set of multiple linear combinations of sampling beams from a set of sampling beams, where the set of sampling beams are defined for the UE. The operations of 1005 may be performed in accordance with examples as disclosed herein. In some examples, aspects of the operations of 1005 may be performed by a reference signal measuring component 825 as described with reference to FIG. 8.

At 1010, the method may include calculating a set of entries of a channel covariance matrix based on the set of received signal strengths of the set of multiple linear combinations of the sampling beams from the set of sampling beams defined for the UE. The operations of 1010 may be performed in accordance with examples as disclosed herein. In some examples, aspects of the operations of 1010 may be performed by a channel covariance matrix calculation component 830 as described with reference to FIG. 8.

At 1015, the method may include communicating with the wireless node based on applying a set of beam weights to an antenna array of the UE, where the set of beam weights are based on the channel covariance matrix. The operations of 1015 may be performed in accordance with examples as disclosed herein. In some examples, aspects of the operations of 1015 may be performed by a beamforming component 835 as described with reference to FIG. 8.

Figure 11:
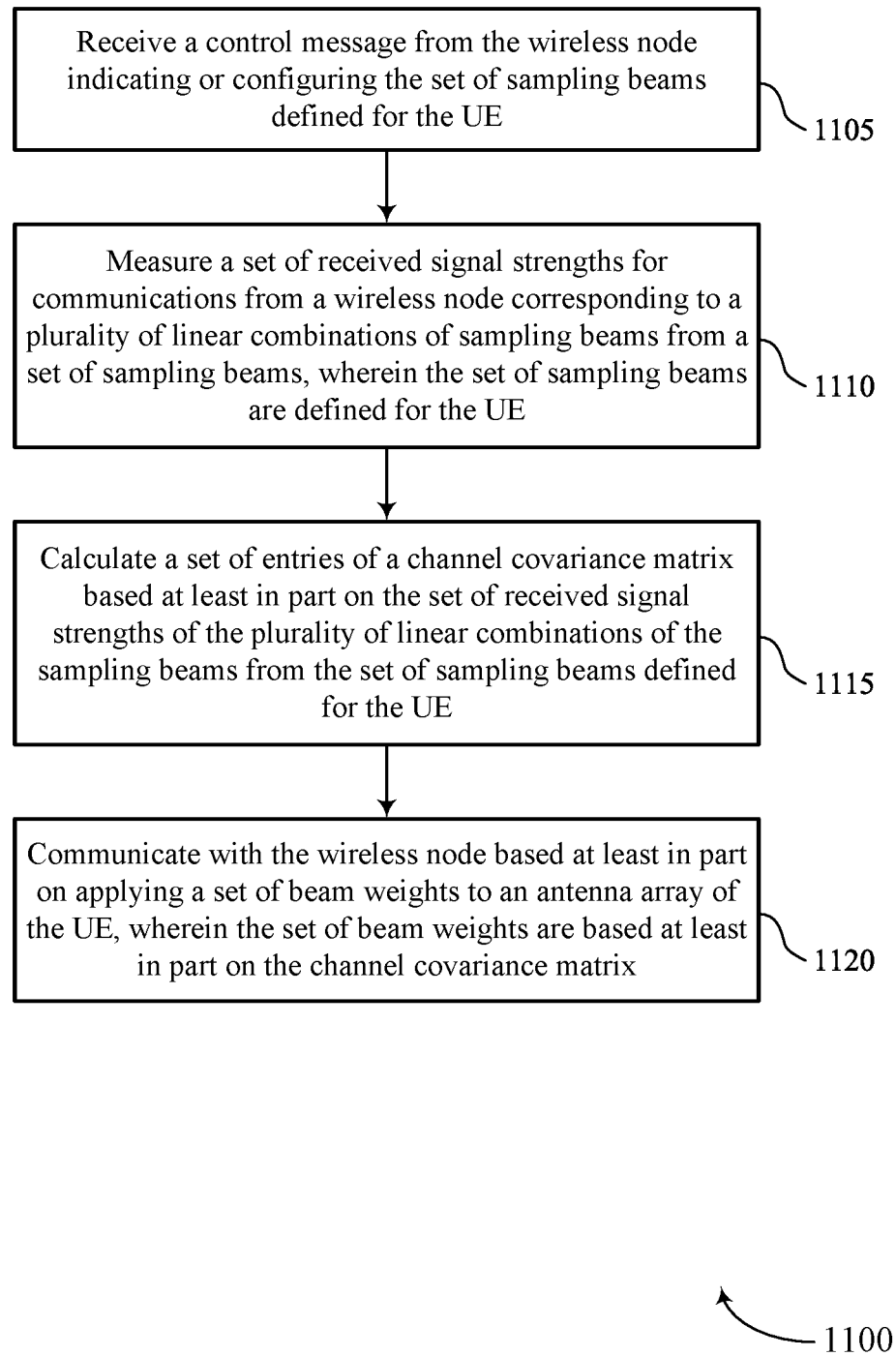

FIG. 11 shows a flowchart illustrating a method 1100 that supports channel statistics based adaptive beam weight estimation in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving a control message from the wireless node indicating or configuring the set of sampling beams defined for the UE. The operations of 1105 may be performed in accordance with examples as disclosed herein. In some examples, aspects of the operations of 1105 may be performed by a control message reception component 840 as described with reference to FIG. 8.

At 1110, the method may include measuring a set of received signal strengths for communications from a wireless node corresponding to a set of multiple linear combinations of sampling beams from a set of sampling beams, where the set of sampling beams are defined for the UE. The operations of 1110 may be performed in accordance with examples as disclosed herein. In some examples, aspects of the operations of 1110 may be performed by a reference signal measuring component 825 as described with reference to FIG. 8.

At 1115, the method may include calculating a set of entries of a channel covariance matrix based on the set of received signal strengths of the set of multiple linear combinations of the sampling beams from the set of sampling beams defined for the UE. The operations of 1115 may be performed in accordance with examples as disclosed herein. In some examples, aspects of the operations of 1115 may be performed by a channel covariance matrix calculation component 830 as described with reference to FIG. 8.

At 1120, the method may include communicating with the wireless node based on applying a set of beam weights to an antenna array of the UE, where the set of beam weights are based on the channel covariance matrix. The operations of 1120 may be performed in accordance with examples as disclosed herein. In some examples, aspects of the operations of 1120 may be performed by a beamforming component 835 as described with reference to FIG. 8.

Figure 12:
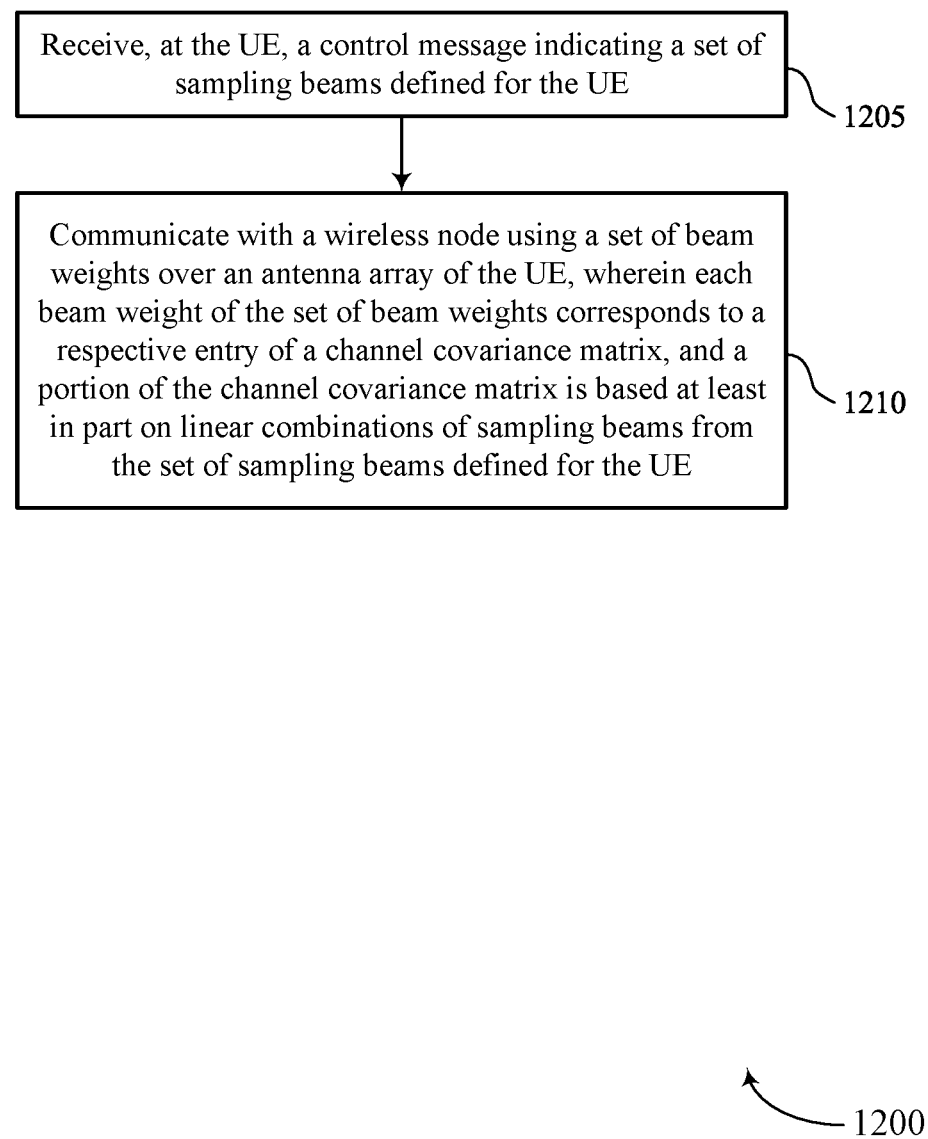

FIG. 12 shows a flowchart illustrating a method 1200 that supports channel statistics based adaptive beam weight estimation in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving, at the UE, a control message indicating a set of sampling beams defined for the UE. The operations of 1205 may be performed in accordance with examples as disclosed herein. In some examples, aspects of the operations of 1205 may be performed by a control message reception component 840 as described with reference to FIG. 8.

At 1210, the method may include communicating with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE. The operations of 1210 may be performed in accordance with examples as disclosed herein. In some examples, aspects of the operations of 1210 may be performed by a beamforming component 835 as described with reference to FIG. 8.

Figure 13:
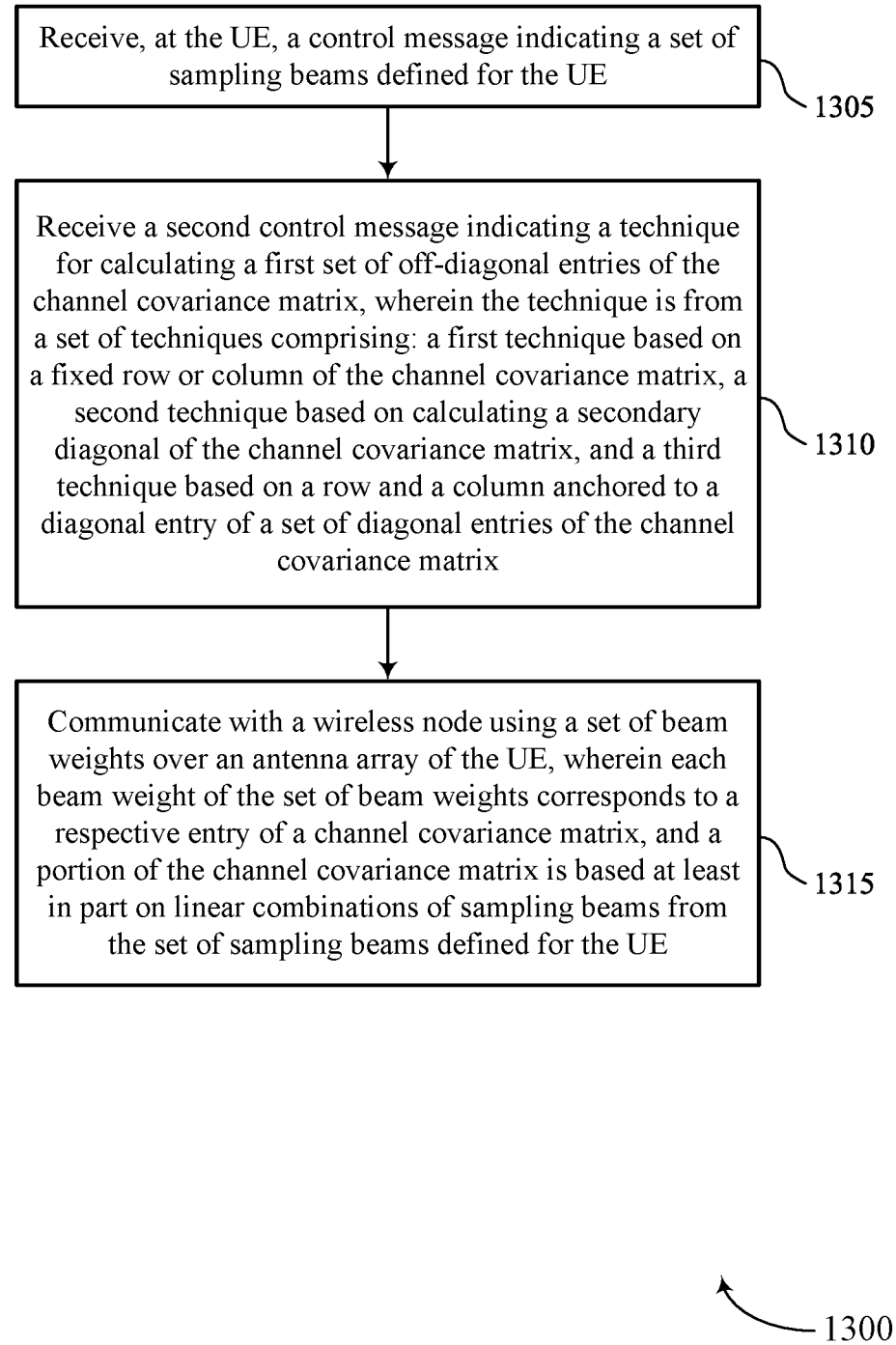

FIG. 13 shows a flowchart illustrating a method 1300 that supports channel statistics based adaptive beam weight estimation in accordance with one or more aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include receiving, at the UE, a control message indicating a set of sampling beams defined for the UE. The operations of 1305 may be performed in accordance with examples as disclosed herein. In some examples, aspects of the operations of 1305 may be performed by a control message reception component 840 as described with reference to FIG. 8.

At 1310, the method may include receiving a second control message indicating a technique for calculating a first set of off-diagonal entries of the channel covariance matrix, where the technique is from a set of techniques including: a first technique based on a fixed row or column of the channel covariance matrix, a second technique based on calculating a secondary diagonal of the channel covariance matrix, and a third technique based on a row and a column anchored to a diagonal entry of a set of diagonal entries of the channel covariance matrix. The operations of 1310 may be performed in accordance with examples as disclosed herein. In some examples, aspects of the operations of 1310 may be performed by a control message reception component 840 as described with reference to FIG. 8.

At 1315, the method may include communicating with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE. The operations of 1315 may be performed in accordance with examples as disclosed herein. In some examples, aspects of the operations of 1315 may be performed by a beamforming component 835 as described with reference to FIG. 8.

The following provides an overview of aspects of the present disclosure:

Aspect 1: A method for wireless communications, at a UE including: measuring a set of received signal strengths for communications from a wireless node corresponding to a set of linear combinations of sampling beams from a set of sampling beams, where the set of sampling beams are defined for the UE; calculating a set of entries of a channel covariance matrix based on the set of received signal strengths of the set of linear combinations of the sampling beams from the set of sampling beams defined for the UE; and communicating with the wireless node based on applying a set of beam weights to an antenna array of the UE, where the set of beam weights are based on the channel covariance matrix.

Aspect 2: The method of aspect 1, further including: receiving a control message from the wireless node indicating or configuring the set of sampling beams defined for the UE.

Aspect 3: The method of any of aspects 1 through 2, where calculating the set of entries of the channel covariance matrix further includes: calculating a set of diagonal entries of the channel covariance matrix based on the set of sampling beams; calculating a first set of off-diagonal entries of the channel covariance matrix, where each of the first set of off-diagonal entries is calculated using the set of received signal strengths of the set of linear combinations of the sampling beams; and estimating a second set of off-diagonal entries of the channel covariance matrix that are different from the first set of off-diagonal entries based on the calculated first set of off-diagonal entries and the calculated set of diagonal entries.

Aspect 4: The method of aspect 3, further including: receiving a control message indicating a technique for determining the first set of off-diagonal entries to be calculated in the channel covariance matrix, where the technique is from a set of techniques including: a first technique based on a fixed row or a fixed column of the channel covariance matrix, a second technique based on calculating a secondary diagonal of the channel covariance matrix, and a third technique based on a row and a column anchored to a diagonal entry of the set of diagonal entries of the channel covariance matrix.

Aspect 5: The method of aspect 4, where the technique is defined according to one or more of control signaling received from the wireless node, a priori rule stored at the UE, or both.

Aspect 6: The method of any of aspects 3 through 5, further including: calculating a dominant eigenvector of the channel covariance matrix based on one or more of: the calculated set of diagonal entries, the calculated first set of off-diagonal entries, or the estimated second set of off-diagonal entries, where the set of beam weights is selected according to the dominant eigenvector.

Aspect 7: The method of any of aspects 3 through 6, where the calculated set of diagonal entries, the calculated first set of off-diagonal entries, and the estimated second set of off-diagonal entries comprise a first portion of the channel covariance matrix, the method further including: setting a second portion of the channel covariance matrix to zero.

Aspect 8: The method of any of aspects 1 through 7, where the set of received signal strengths corresponds to a single or multiple subcarriers and the communicating with the wireless node occurs over multiple subcarriers.

Aspect 9: The method of any of aspects 1 through 8, where one or more beams of the set of sampling beams are defined by a set of columns of a unitary matrix.

Aspect 10: The method of any of aspects 1 through 9, where one or more beams of the set of sampling beams are defined by selecting a single antenna from a set of antenna elements of the antenna array.

Aspect 11: The method of any of aspects 1 through 10, where the wireless node is a network entity or a second UE.

Aspect 12: The method of any of aspects 1 through 11, where the set of sampling beams is defined for the UE based on one or more of a capability of the set of sampling beams to minimize a mean squared error in calculating the set of entries of the channel covariance matrix, an amplitude control capability of the UE associated with generating the set of linear combinations of the sampling beams from the set of sampling beams, and a storage capacity of an RFIC memory of the UE.

Aspect 13: A method for wireless communications, at a UE including: receiving, at the UE, a control message indicating a set of sampling beams defined for the UE; and communicating with a wireless node using a set of beam weights over an antenna array of the UE, where each beam weight of the set of beam weights corresponds to a respective entry of a channel covariance matrix, and a portion of the channel covariance matrix is based on linear combinations of sampling beams from the set of sampling beams defined for the UE.

Aspect 14: The method of aspect 13, further including: receiving a second control message indicating a technique for calculating a first set of off-diagonal entries of the channel covariance matrix, where the technique is from a set of techniques including: a first technique based on a fixed row or column of the channel covariance matrix, a second technique based on calculating a secondary diagonal of the channel covariance matrix, and a third technique based on a row and a column anchored to a diagonal entry of a set of diagonal entries of the channel covariance matrix.

Aspect 15: The method of any of aspects 13 through 14, where the wireless node is a network entity or a second UE.

Aspect 16: The method of any of aspects 13 through 15, further including: transmitting an assistance information message indicating the set of sampling beams defined for the UE, where the control message is received based on the assistance information message.

Aspect 17: The method of any of aspects 13 through 16, further including: transmitting, to a second UE via sidelink, an indication of the set of beam weights used for communicating with the second UE; and receiving, from the second UE via sidelink, an indication of a second set of beam weights used at the second UE for communication with the UE.

Aspect 18: The method of any of aspects 13 through 17, where the set of sampling beams is based on one or more of a capability of the sampling beams to minimize a mean squared error in calculating a set of entries of the channel covariance matrix, an amplitude control capability of the UE associated with the linear combinations of the sampling beams, or a storage capacity of an RFIC memory of the UE.

Aspect 19: An apparatus for wireless communications, including a processor; memory coupled with the processor; and instructions stored in the memory and executable by the processor to cause the apparatus to perform a method of any of aspects 1 through 12.

Aspect 20: An apparatus for wireless communications, including at least one means for performing a method of any of aspects 1 through 12.

Aspect 21: A non-transitory computer-readable medium storing code for wireless communications, the code including instructions executable by a processor to perform a method of any of aspects 1 through 12.

Aspect 22: An apparatus for wireless communications, including a processor; memory coupled with the processor; and instructions stored in the memory and executable by the processor to cause the apparatus to perform a method of any of aspects 13 through 18.

Aspect 23: An apparatus for wireless communications, including at least one means for performing a method of any of aspects 13 through 18.

Aspect 24: A non-transitory computer-readable medium storing code for wireless communications, the code including instructions executable by a processor to perform a method of any of aspects 13 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
one or more processors;
one or more memories coupled with the one or more processors; and
one or more processor-readable instructions stored in the one or more memories and executable by the one or more processors individually or collectively to cause the apparatus to:
measure a set of received signal strengths for communications from a wireless node corresponding to a plurality of linear combinations of sampling beams from a set of sampling beams, wherein the set of sampling beams satisfy one or more beam characteristics that are associated with covariance matrix generation;
calculate a set of entries of an estimated channel covariance matrix based at least in part on the set of received signal strengths of the plurality of linear combinations of the sampling beams from the set of sampling beams that satisfy the one or more beam characteristics associated with the covariance matrix generation; and
communicate with the wireless node based at least in part on applying a set of beam weights to an antenna array of the UE, wherein the set of beam weights are based at least in part on the estimated channel covariance matrix.

2. The apparatus of claim 1, wherein the one or more processor-readable instructions are further executable by the one or more processors individually or collectively to cause the apparatus to:
receive a control message from the wireless node indicating or configuring the set of sampling beams that satisfy the one or more beam characteristics associated with the covariance matrix generation.

3. The apparatus of claim 1, wherein the one or more processor-readable instructions to calculate the set of entries of the estimated channel covariance matrix are further executable by the one or more processors individually or collectively to cause the apparatus to:
calculate a set of diagonal entries of the estimated channel covariance matrix based at least in part on the set of sampling beams;
calculate a first set of off-diagonal entries of the estimated channel covariance matrix, wherein each of the first set of off-diagonal entries is calculated using the set of received signal strengths of the plurality of linear combinations of the sampling beams; and
estimate a second set of off-diagonal entries of the estimated channel covariance matrix that are different from the first set of off-diagonal entries based at least in part on the calculated first set of off-diagonal entries and the calculated set of diagonal entries.

4. The apparatus of claim 3, wherein the one or more processor-readable instructions are further executable by the one or more processors individually or collectively to cause the apparatus to:
receive a control message indicating a technique for determining the first set of off-diagonal entries to be calculated in the estimated channel covariance matrix, wherein the technique is from a set of techniques comprising: a first technique based on a fixed row or a fixed column of the estimated channel covariance matrix, a second technique based on calculating a secondary diagonal of the estimated channel covariance matrix, and a third technique based on a row and a column anchored to a diagonal entry of the set of diagonal entries of the estimated channel covariance matrix.

5. The apparatus of claim 4, wherein the technique is defined according to one or more of control signaling received from the wireless node, a priori rule stored at the UE, or both.

6. The apparatus of claim 3, wherein the one or more processor-readable instructions are further executable by the one or more processors individually or collectively to cause the apparatus to:
calculate a dominant eigenvector of the estimated channel covariance matrix based at least in part on one or more of: the calculated set of diagonal entries, the calculated first set of off-diagonal entries, or the estimated second set of off-diagonal entries, wherein the set of beam weights is selected according to the dominant eigenvector.

7. The apparatus of claim 3, wherein the calculated set of diagonal entries, and the one or more processor-readable instructions are further executable by the one or more processors individually or collectively to cause the apparatus to:
set a second portion of the estimated channel covariance matrix to zero.

8. The apparatus of claim 1, wherein the set of received signal strengths corresponds to a single or multiple subcarriers and the communicating with the wireless node occurs over multiple subcarriers.

9. The apparatus of claim 1, wherein one or more beams of the set of sampling beams are defined by a set of columns of a unitary matrix that satisfies a signal quality threshold associated with the one or more beam characteristics.

10. The apparatus of claim 9, wherein the one or more beams of the set of sampling beams are defined by the set of columns of the unitary matrix based at least in part on a noise metric of an associated communications channel being above a noise value threshold.

11. The apparatus of claim 1, wherein one or more beams of the set of sampling beams are defined by selecting a single antenna from a set of antenna elements of the antenna array, wherein selecting the single antenna from the set of antenna elements satisfies a covariance matrix generation threshold associated with the one or more beam characteristics.

12. The apparatus of claim 11, wherein the one or more beams of the set of sampling beams are defined by selecting the single antenna from the set of antenna elements of the antenna array based at least in part on a noise metric of an associated communications channel being below a noise value threshold.

13. The apparatus of claim 1, wherein the wireless node is a network entity or a second UE.

14. The apparatus of claim 1, wherein a capability of the set of sampling beams to minimize a mean squared error in calculating the set of entries of the estimated channel covariance matrix, an amplitude control capability of the UE associated with generating the plurality of linear combinations of the sampling beams from the set of sampling beams, and a storage capacity of a radio frequency integrated circuit (RFIC) chip memory of the UE.

15. An apparatus for wireless communications at a user equipment (UE), comprising:
one or more processors;
one or more memories coupled with the one or more processors; and
one or more processor-readable instructions stored in the one or more memories and executable by the one or more processors individually or collectively to cause the apparatus to:
receive a control message indicating a set of sampling beams that satisfy one or more beam characteristics associated with covariance matrix generation; and
communicate with a wireless node using a set of beam weights over an antenna array of the UE, wherein each beam weight of the set of beam weights corresponds to a respective entry of an estimated channel covariance matrix, and a portion of the estimated channel covariance matrix is based at least in part on linear combinations of sampling beams from the set of sampling beams that satisfy the one or more beam characteristics associated with the covariance matrix generation.

16. The apparatus of claim 15, wherein the one or more processor-readable instructions are further executable by the one or more processors individually or collectively to cause the apparatus to:
receive a second control message indicating a technique for calculating a first set of off-diagonal entries of the estimated channel covariance matrix, wherein the technique is from a set of techniques comprising: a first technique based on a fixed row or column of the estimated channel covariance matrix, a second technique based on calculating a secondary diagonal of the estimated channel covariance matrix, and a third technique based on a row and a column anchored to a diagonal entry of a set of diagonal entries of the estimated channel covariance matrix.

17. The apparatus of claim 15, wherein the wireless node is a network entity or a second UE.

18. The apparatus of claim 15, wherein the one or more processor-readable instructions are further executable by the one or more processors individually or collectively to cause the apparatus to:
transmit an assistance information message indicating the set of sampling beams that satisfy the one or more beam characteristics associated with the covariance matrix generation, wherein the control message is received based at least in part on the assistance information message.

19. The apparatus of claim 15, wherein the one or more processor-readable instructions are further executable by the one or more processors individually or collectively to cause the apparatus to:
transmit, to a second UE via sidelink, an indication of the set of beam weights associated with a bi-directional configuration of the set of sampling beams used for communicating with the second UE; and
receive, from the second UE via the sidelink, an indication of a second set of beam weights associated with the bi-directional configuration of the set of sampling beams used at the second UE for communication with the UE.

20. The apparatus of claim 15, wherein the set of sampling beams is based at least in part on one or more of a capability of the sampling beams to minimize a mean squared error in calculating a set of entries of the estimated channel covariance matrix, an amplitude control capability of the UE associated with the linear combinations of the sampling beams, or a storage capacity of a radio frequency integrated circuit (RFIC) chip memory of the UE.

21. A method for wireless communications, at a user equipment (UE) comprising:
measuring a set of received signal strengths for communications from a wireless node corresponding to a plurality of linear combinations of sampling beams from a set of sampling beams, wherein the set of sampling beams satisfy one or more beam characteristics that are associated with covariance matrix generation;
calculating a set of entries of an estimated channel covariance matrix based at least in part on the set of received signal strengths of the plurality of linear combinations of the sampling beams from the set of sampling beams that satisfy the one or more beam characteristics associated with the covariance matrix generation; and
communicating with the wireless node based at least in part on applying a set of beam weights to an antenna array of the UE, wherein the set of beam weights are based at least in part on the estimated channel covariance matrix.

22. The method of claim 21, further comprising:
receiving a control message from the wireless node indicating or configuring the set of sampling beams that satisfy the one or more beam characteristics associated with the covariance matrix generation.

23. The method of claim 21, wherein calculating the set of entries of the estimated channel covariance matrix further comprises:
calculating a set of diagonal entries of the estimated channel covariance matrix based at least in part on the set of sampling beams;
calculating a first set of off-diagonal entries of the estimated channel covariance matrix, wherein each of the first set of off-diagonal entries is calculated using the set of received signal strengths of the plurality of linear combinations of the sampling beams; and
estimating a second set of off-diagonal entries of the estimated channel covariance matrix that are different from the first set of off-diagonal entries based at least in part on the calculated first set of off-diagonal entries and the calculated set of diagonal entries.

24. The method of claim 23, further comprising:
receiving a control message indicating a technique for determining the first set of off-diagonal entries to be calculated in the estimated channel covariance matrix, wherein the technique is from a set of techniques comprising: a first technique based on a fixed row or a fixed column of the estimated channel covariance matrix, a second technique based on calculating a secondary diagonal of the estimated channel covariance matrix, and a third technique based on a row and a column anchored to a diagonal entry of the set of diagonal entries of the estimated channel covariance matrix.

25. The method of claim 24, wherein the technique is defined according to one or more of control signaling received from the wireless node, a priori rule stored at the UE, or both.

26. The method of claim 23, further comprising:
calculating a dominant eigenvector of the estimated channel covariance matrix based at least in part on one or more of: the calculated set of diagonal entries, the calculated first set of off-diagonal entries, or the estimated second set of off-diagonal entries, wherein the set of beam weights is selected according to the dominant eigenvector.

27. The method of claim 23, wherein the calculated set of diagonal entries, the calculated first set of off-diagonal entries, and the estimated second set of off-diagonal entries comprise a first portion of the estimated channel covariance matrix, the method further comprising:
setting a second portion of the estimated channel covariance matrix to zero.

28. The method of claim 21, wherein the set of received signal strengths corresponds to a single or multiple subcarriers and the communicating with the wireless node occurs over multiple subcarriers.

29. A method for wireless communications, at a user equipment (UE) comprising:
receiving a control message indicating a set of sampling beams that satisfy one or more beam characteristics associated with covariance matrix generation; and
communicating with a wireless node using a set of beam weights over an antenna array of the UE, wherein each beam weight of the set of beam weights corresponds to a respective entry of an estimated channel covariance matrix, and a portion of the estimated channel covariance matrix is based at least in part on linear combinations of sampling beams from the set of sampling beams that satisfy the one or more beam characteristics associated with the covariance matrix generation.

30. The method of claim 29, further comprising:
receiving a second control message indicating a technique for calculating a first set of off-diagonal entries of the estimated channel covariance matrix, wherein the technique is from a set of techniques comprising: a first technique based on a fixed row or column of the estimated channel covariance matrix, a second technique based on calculating a secondary diagonal of the estimated channel covariance matrix, and a third technique based on a row and a column anchored to a diagonal entry of a set of diagonal entries of the estimated channel covariance matrix.

* * * * *